US010171383B2

(12) United States Patent
Johnston et al.

(10) Patent No.: US 10,171,383 B2
(45) Date of Patent: Jan. 1, 2019

(54) METHODS AND SYSTEMS FOR PORTABLY DEPLOYING APPLICATIONS ON ONE OR MORE CLOUD SYSTEMS

(71) Applicant: Sony Interactive Entertainment America LLC, San Mateo, CA (US)

(72) Inventors: Joel Johnston, San Diego, CA (US); Stephen Paul Henrie, San Diego, CA (US)

(73) Assignee: Sony Interactive Entertainment America LLC, San Mateo, CA (US)

( * ) Notice: Subject to any disclaimer, the term of this patent is extended or adjusted under 35 U.S.C. 154(b) by 0 days.

(21) Appl. No.: 15/818,009

(22) Filed: Nov. 20, 2017

(65) Prior Publication Data
US 2018/0077084 A1  Mar. 15, 2018

Related U.S. Application Data

(62) Division of application No. 14/539,966, filed on Nov. 12, 2014, now Pat. No. 9,825,881.

(60) Provisional application No. 62/058,076, filed on Sep. 30, 2014.

(51) Int. Cl.
H04L 12/911 (2013.01)
G06F 8/65 (2018.01)
H04L 29/08 (2006.01)
G06F 9/50 (2006.01)

(52) U.S. Cl.
CPC ............. *H04L 47/827* (2013.01); *G06F 8/65* (2013.01); *G06F 9/5072* (2013.01); *H04L 67/10* (2013.01)

(58) Field of Classification Search
CPC ..... H04L 47/827; H04L 67/10; G06F 9/5072; G06F 8/65
See application file for complete search history.

(56) References Cited

U.S. PATENT DOCUMENTS

| 8,732,702 B2 | 5/2014 | Chang et al. |
| 2010/0162260 A1 | 6/2010 | Ibrahim |
| 2012/0089726 A1 | 4/2012 | Doddavula |
| 2014/0095694 A1* | 4/2014 | Kimmet ............. G06F 11/3006 709/224 |

(Continued)

FOREIGN PATENT DOCUMENTS

CN 103023993 A 4/2013

*Primary Examiner* — Kim T Nguyen
(74) *Attorney, Agent, or Firm* — Martine Penilla Group, LLP

(57) ABSTRACT

Methods and systems for provisioning services or resources on a cloud service for successful execution of an application includes detecting a request for executing an application on a cloud service. In response to the request, a descriptor record for the application is retrieved from a descriptor file. The descriptor record is specific for the cloud service and provides details of environmental resources or services required for executing the application. Resource and service requirements are translated into actions to be taken in the cloud service environment for provisioning the resources or services required for the application. The actions to be taken are brokered to occur in pre-defined sequence based on details provided in the descriptor record for the application. Status of the actions taken is provided. The status is used to determine if the required resources or services have been provisioned for successful execution of the application in the cloud service.

20 Claims, 20 Drawing Sheets

(56) References Cited

U.S. PATENT DOCUMENTS

2014/0136711 A1* 5/2014 Benari ................ G06F 9/5061
                                                                   709/226

* cited by examiner

Figure 3

Environment history – run history workflow "activities"

Figure 7

Figure: Environment history – requester details

Hierarchical relationships between levels of access

METHODS AND SYSTEMS FOR PORTABLY DEPLOYING APPLICATIONS ON ONE OR MORE CLOUD SYSTEMS

CLAIM OF PRIORITY

This application is a Divisional Application claiming priority from co-pending U.S. patent application Ser. No. 14/539,966, filed on Nov. 12, 2014, and entitled, "Methods and System for Portably Deploying Applications on One or More Cloud Systems," which claims priority and benefit under 35 USC § 119(e) to U.S. Provisional Application No. 62/058,076, filed on Sep. 30, 2014, and entitled, "Methods and Systems for Portably Deploying Applications on One or More Cloud Systems," disclosure of each of which is incorporated herein by reference in its entirety.

BACKGROUND

1. Field of the Invention

The present invention relates to methods and systems that enable efficient deployment of applications that require provisioning of services and portability to one or more cloud serving infrastructures.

2. Description of the Related Art

The explosive growth of the computing industry has resulted in a rise in the number of applications that require provisioning to enable their launch in one or more environments (e.g., cloud services). Such applications include business applications, social media applications, gaming applications, etc., that may be designed for different hardware/software platforms. Sometimes, applications that are originally provisioned to launch in one specific environment may need to be launched in a different environment. In order for the applications to successfully launch in another or in different environments, an application developer will be required to identify/specify necessary and minimal hardware, software resources required for successful execution of the application in each environment and for other re-provisioning.

Unfortunately, it is very common that the developers/provisioning engineers that designed the requirements for the original launch may no longer work for the same entity or it may be determined that originally assigned resources may be outdated or replaced over time. As a result, it is often very difficult to maintain older applications and to migrate applications to different launching environments, which may have completely different resources, provisioning rules and other operational requirements.

Migration of the application, for example, may include switching from one cloud service having a first set of resources to a second cloud service having a second set of resources, which are different from the first set of resources. The need to switch may be driven by cost, performance, usage, resource availability, etc., and the change may be necessitated to make the application execution environment more cost-effective, while making optimal and effective use of the environmental resources. In order to successfully run the application in the new environment, a lot of re-engineering must take place to ensure that the minimal resource requirements are met within the new environment and resource/service dependencies are in place and clearly defined. Usually, such changes to the application environment are carried out manually. Unfortunately, but very commonly, manual verification may lead to undesired results and excessive re-engineering as there is a higher probability of details being overlooked or lost, in addition to, not being cost-effective.

It is in this context that embodiments of the invention arise.

SUMMARY

Embodiments of the present invention provide a multi-cloud deployment mechanism that allows instances of an application to be deployed on one or across multiple cloud services/platforms. The deployment mechanism includes workflows that use specifications provided in the application to manage the services, resources and service state in any of the cloud services/platforms in which the application is instantiated. The deployment mechanism provides a framework for application developers to use to specify the resource requirements for successful application execution in an environment of a cloud service and the deployment mechanism will automatically provision the necessary resources/services in the environment. In order to accomplish the task of provisioning the necessary resources/services, the deployment mechanism will determine the actions that need to be taken, schedule the actions through respective workflows, monitor the actions, and provide a log of the actions taken in order to determine if the required or sufficient services/resources have been provisioned and to provide the status of the environment for successful execution of the application.

In one embodiment, the framework may provide a descriptor method that enables a deployment engineer to specify resources needed for an application, without having to specifically identify and provision specific services. The descriptor method may, in one implementation, be in the form of a JSON descriptor document. The JSON descriptor document includes a record for each environment in which the application is designed to execute. The JSON record is used to outline specifics of all the services and resources that are needed for the execution of the application, including cloud service, network, storage, type of processor, or any other kind of technical resource that would need to be provisioned within the environment for the application to execute. A deployment mechanism then translates the requirements into specific actions that need to be taken. Each of the actions identified in the translation is associated with a workflow that is designed to provision a required resource or service, when instantiated. The deployment mechanism, thus, is a complex and scalable system of inter-dependent services that communicate with each other through a centralized message broker to get information and to coordinate complex and time-dependent orchestration of workflow tasks. The deployment mechanism comprises loosely coupled and distributed service components and back-end services to provide a reliable environmental platform for hosting the application. The deployment mechanism provides the ability to provision, contextualize, configure, use, monitor, troubleshoot, scale and decommission services/resources during the development, testing, production and maintenance of applications, such as gaming applications, entertainment applications, business service applications, internet applications, web site allocations, etc.

In one embodiment, a method is provided. The method includes detecting a request for executing an application in an environment of a cloud service. In response to the request, a descriptor file is accessed from a repository. The descriptor file includes one or more descriptor records that are defined for each application for execution on one or more cloud services. A descriptor record for the application is retrieved from the descriptor file, in response to the request. The descriptor record is specific for the cloud service environment and provides details of environmental resources or services required for executing the application on the cloud service. The resource and service requirements defined in the descriptor record are translated into one or more actions that need to be taken in the cloud service environment for provisioning the services and resources for the execution of the application. Status of actions taken is provided, in response to the request. The statuses are used in determining if the required resources and services have been provisioned for successful execution of the application in the cloud service.

In another embodiment, a method is disclosed. The method includes receiving attributes of one or more resources and one or more services required on a cloud system for executing an application. A descriptor record is generated for the application using the received attributes. The descriptor record defines an environment profile that is specific for the cloud system. The descriptor record is generated by translating the resource and service requirements into one or more actions that need to be taken for provisioning the required resources and services in the cloud system for successful execution of the application. The descriptor record is stored in a descriptor file maintained in a deployment system database for retrieval during subsequent execution of the application in the cloud system. The retrieval causing triggering of the actions identified in the descriptor record for provisioning the required services and resources on the cloud system to enable successful execution of the application.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings.

FIG. 3 illustrates an exemplary publish environment view, in accordance with an embodiment of the invention.

FIG. 7 illustrates an exemplary screen rendering environment history overview, in accordance to an embodiment of the invention.

DETAILED DESCRIPTION

Figure 1:
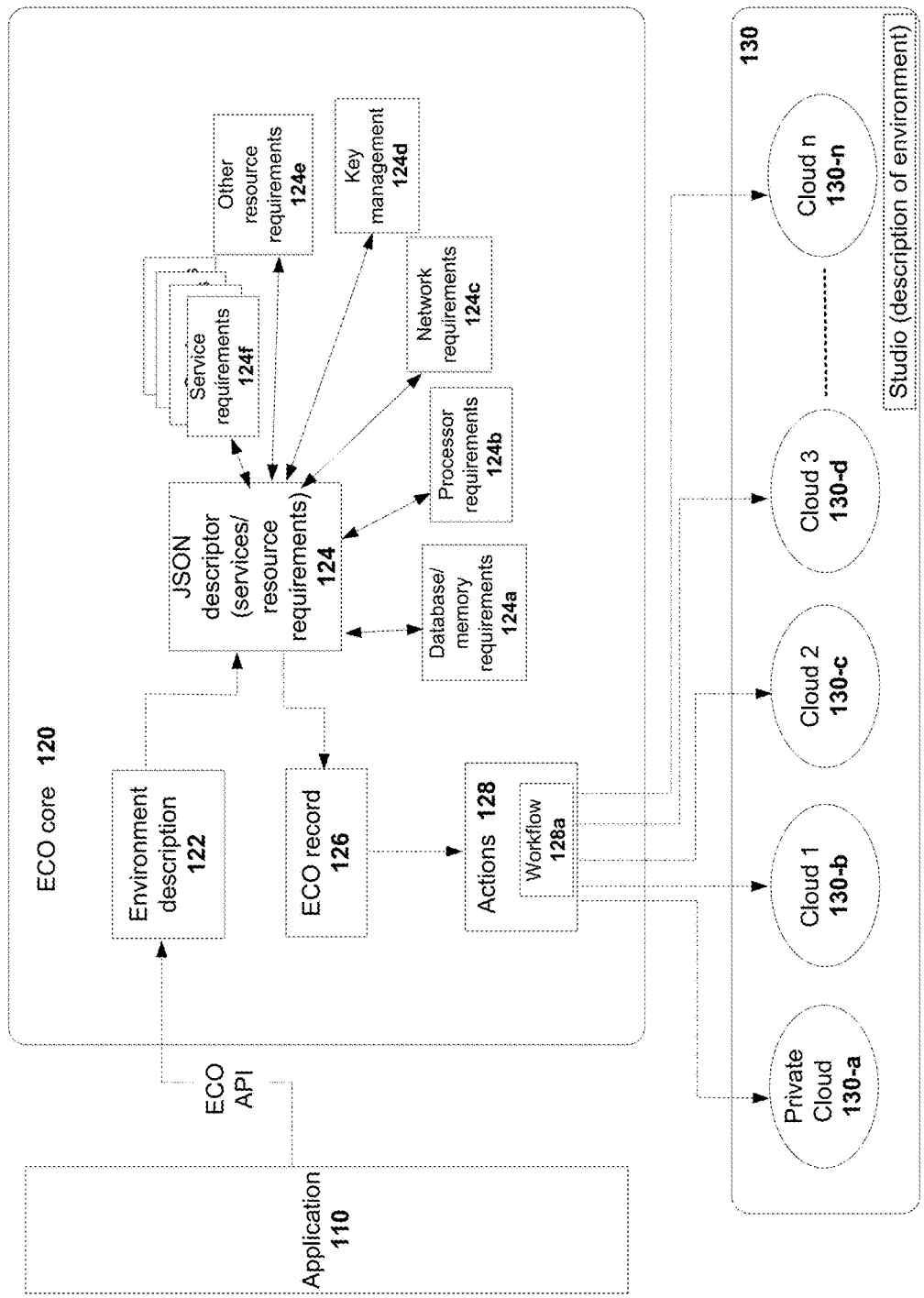
FIG. 1 illustrates an overview of a system in which deployment mechanism is provided, in accordance with an embodiment of the invention.

Embodiments of the present invention provide one or multi-cloud deployment mechanism that allows instances of an application to be deployed in one or multiple cloud services/platforms and for automatically provisioning the necessary resources/services for successful execution of an application instance in the deployed cloud service/platform. The deployment mechanism is a scalable system of interdependent services that communicate with each other and coordinate complex orchestration of workflow tasks. The workflow tasks operate in a time ordered or a sequential fashion, as the deployment mechanism framework keeps track of which task is complete and which task needs to be processed before other tasks to maintain coordinated and interdependent execution. The deployment mechanism includes a centralized set of core service components, a set of backend services, and service layers. The core service components are configured for interacting with the end user, for managing operational workflows and for coordinating communication between the core service components and the environmental resources hosted within the environment. The core service components are configured to provision resources, such as servers/processors, memory, etc., configure services/applications, deploy software, configure domain naming system, auto-scale resources/services, monitor application and resource status, manage storage, etc. The core service components communicate with the backend services through service layers that act as liaisons between the core service components and the backend services. The distributed service layers provide a layer of abstraction to make the core service components interoperable using message-based communication and easily replaceable as technologies evolve. The scalable framework allows new technologies to be wrapped within the service layers and integrated into the cloud services without affecting the set of core service components. The scalable framework also allows end users to update existing services, change or remove old services and integrate new services based on changing needs and/or technological advancements made over time.

In one embodiment, the framework is provided in the form of a JSON (JavaScript Object Notation) descriptor file. Usage of JSON descriptor for defining the requirements is exemplary and should not be considered restrictive as other program languages or other syntax or file forms or data structures may be used. The descriptor file represents a tree-structure of name/value pairs and includes a plurality of records, with each record in the descriptor file specifying the service/resource requirements for executing an application in an environment of a specific cloud service or a server computing system. Each record, for example, specifies the storage, network, processing resource, cloud service, and other kind of technical resource requirements that need to be provisioned in order for the application to execute in the specific environment.

FIG. 1 illustrates a simplified overview of a deployment mechanism that is used to deploy an application on to a specific environment of a cloud service, in one embodiment. In this embodiment, an application developer, developing an application 110, can access the deployment mechanism through an application programming interface (API) to specify the resources/services required for successful execution of the application 110. The deployment mechanism is represented in FIG. 1 as a Cloud Ecosystem (ECO) core module 120 and the API to access the ECO core is represented as the ECO API. The deployment mechanism 120 allows the developer to describe the environment 122, in which the application 110 is to execute. For example, the deployment mechanism may provide tools, such as the API accessed through a graphical user interface or command line interface, to allow the developer to specify the minimal resources and/or services required in the environment so that the application 110 can execute. The aforementioned tool(s) are exemplary and should not be considered exhaustive. Other tools or ways may be provided to enable the developer to specify the environment for executing the application that he/she has developed. The environment description 122 specified by the developer is provided as a descriptor record that is updated to a descriptor file 124, such as a JSON descriptor file. In an alternate embodiment, the developer may provide the code of the application to the deployment mechanism 120. The deployment mechanism 120 may analyze the code of the application to determine the resources/services that are required for successful execution of the application in a specific environment. The resource/service requirement information is used to define a descriptor record that is updated to the descriptor file and is used during execution of the application for provisioning services/resources in the specific environment.

As the name indicates, the JSON (JavaScript Online Notation) descriptor uses a JavaScript scripting language to define data objects in the form of an attribute name-value pair and is used to transmit data between an application and a service component. It should be appreciated that JSON is but one example code language and other languages may be used so long as the functionality is provided. In this example, the JSON descriptor 124 takes the specification provided by the developer or the requirements identified by the mechanism and generates a record (for e.g., descriptor or ECO record 126) mapping the service/resource requirement (i.e., attribute name in the attribute name-value pair) to an action that needs to be performed for provisioning the necessary service/resource (i.e., the value of the attribute name-value pair) for each environment of a cloud service on which the application is to be hosted for execution. The descriptor record is associated with an instance of the application so that when the application needs to be executed in the environment at a later time, the correct descriptor record for the application may be quickly identified and the appropriate resources and services provisioned for successful execution of the application instance in the environment. In one embodiment, each of the generated records 126, for example, identify the minimal resources/services, such as database/storage 124a, processor 124b, network 124c, key management 124d, other resources 124e, other services 124f, etc., required for successful execution of the application in the respective environment. Using the information provided in the ECO descriptor record (i.e., descriptor record) the ECO core (i.e., deployment mechanism) identifies the necessary actions 128 that need to be taken for provisioning the services/resources. A workflow 128a is instantiated for each action identified in the ECO descriptor record so that the necessary services and resources are provisioned in the respective environment. The identified actions may include actions that need to be taken before execution of an instance of the application, actions that need to be taken during the execution of the application instance and actions that need to be taken after completion of the application instance. Accordingly, the actions may include provisioning the required resources, checking resource dependencies of the provisioned resources, migration of one or more resources or services, stopping a service, instantiating application and/or resources/services, verifying successful completion of the application, checking error log to determine if the application executed successfully or not, etc.

Once the workflows 128a are identified, the workflows 128a are executed by a set of Workflow service worker processes to allow the workflow to take the necessary actions of provisioning the resources/services in the appropriate cloud service 130, instantiating the application, generating logs of the status of the actions taken/not taken in relation to the services/resources and returning status of the actions taken/not taken. The action status may be used for providing application execution updates to the developer. The cloud service environment in which the resources/services are provisioned for executing the application, may be a private or a publicly available cloud services/environment.

The ECO record is updated periodically based on changes detected at the one or more resources/services that are mapped to the application. For example, in one embodiment, old resources may be removed and new resources added, resources may be removed, changed, replaced and/or upgraded due to failures, routine maintenance, etc., and the ECO core allows for seamless transition from one resource to another, in the background, so that application executes without noticeable downtime. In one embodiment, when an old resource is removed and a new resource added, the ECO core automatically orchestrates migration of data from the old resource to the new resource and updates the ECO record for the application in the specific environment to reflect the changes. In an alternate example, the existing resources may be upgraded as part of routine maintenance. For instance, additional storage may be added to the existing storage resource provider. In this embodiment, the upgrades may be seamlessly performed in the background without affecting the performance of the application executing on a server or cloud service and the changes to the resources due to the upgrades may be updated to the ECO record in substantial real-time. In one embodiment, the upgrades to one or more resources may be a temporary upgrade and may be done to allow the application to execute optimally. In this embodiment, the ECO record may not be updated to reflect the change due to the upgrade. In an alternate embodiment, the upgrade to a resource may be permanent and such upgrade information may be updated to the ECO record. Similarly, when a service is upgraded, the ECO record may be updated to include the upgrade information. The service layers within the deployment mechanism provide a layer of abstraction that takes the core service/resource requirements and maps them to the actual services/resources available within a cloud service.

In another embodiment, the application may be migrated from one cloud service to a different cloud service. Such migration may be performed based on type of performance desired for the application. For example, the migration may be initiated automatically by the ECO core in order to reduce cost, increase performance, based on resource availability, etc. In some embodiments, a set of pre-defined rules may be defined for the application and the decision to migrate the service and/or resources may be automatic based on the pre-defined rules. The pre-defined rules may be defined by the developer and updated periodically either by the developer or by the deployment mechanism based on the changes detected in the environment. For example, one of the pre-defined rules may indicate selecting an environment and/or resources/services based on cost. In another example, a pre-defined rule may indicate selecting an environment and/or resources/services based on performance. In both the examples, the ECO core may periodically, (a) collect and analyze data received from the various resources that are provisioned in the cloud for executing an instance of the application based on the pre-defined rules; (b) determine prices of the resources or performance of the application; (c) generate the profile of various resources/environment; and (d) determine when to migrate specific ones of the resources to different resources on the same cloud service or on a different cloud services, when to migrate the application from one cloud service to another, when to continue engaging the existing resources, when to continue using the existing cloud service, etc. Based on the analysis and determination, the ECO core may continue to engage the cloud service and the existing resources/services of the cloud service or may perform the migration of the application from the old cloud service to the new cloud service. The migration includes identifying the resources/services that need to be provisioned in the new cloud service, triggering the appropriate workflow(s) to provision the resources/services in the new cloud service, and instantiating the application to use the provisioned services/resources of the new cloud service. The migration may entail re-mapping the application instance within the ECO record to reflect change to the one or more resources/services or change to the cloud service.

In one embodiment, the pre-defined rules may indicate initiating a migration based on temporal and/or geographical demand for the application, based on resource availability or based on predictive analysis of historical usage of the resources at different periods of time in different geographies. The historical usage data provided in the metadata of the application is examined to determine the usage pattern of resources during different periods of time and in different geo locations, identifying demand of the application at different periods of time in different geo locations, determining resource/services availability during the different periods, cost of the available resources/services, capability of the resources/services to meet the demand, type of performance (i.e., cost-based, performance-based, resource-optimality-based, etc.,) expected for the application as defined by the pre-defined rules, etc. Based on the examination, a decision is made to keep the existing environment or to migrate to a different environment.

Continuing to refer to FIG. 1, the workflows for provisioning the resources and services for the execution of the application may be deployed to any one of the private or public clouds (130-a through 130-n) where the application is deployed to execute. When the application migrates to a new cloud service, corresponding workflows are identified and deployed in the new cloud service. In one embodiment, the migration of the application would result in a new instance of the application being provided for the new cloud service and a new ECO record is generated mapping the new instance of the application to the resources/services associated with the migrated cloud service. In this embodiment, the original ECO record may continue to be mapped to the resources/service associated with the old cloud service so that if and when the application is selected for execution in the old cloud service, the existing application instance may execute and use the resources/services provisioned and mapped to the application instance on the old cloud service. In an alternate embodiment, the re-mapping may result in the updating of the existing ECO record to map the application instance to the resources/services of the new cloud service instead of the resources/services from the old cloud service, such that any time the application is executed it will execute on the new cloud service using the resources/services of the new cloud service.

Figure 1A:
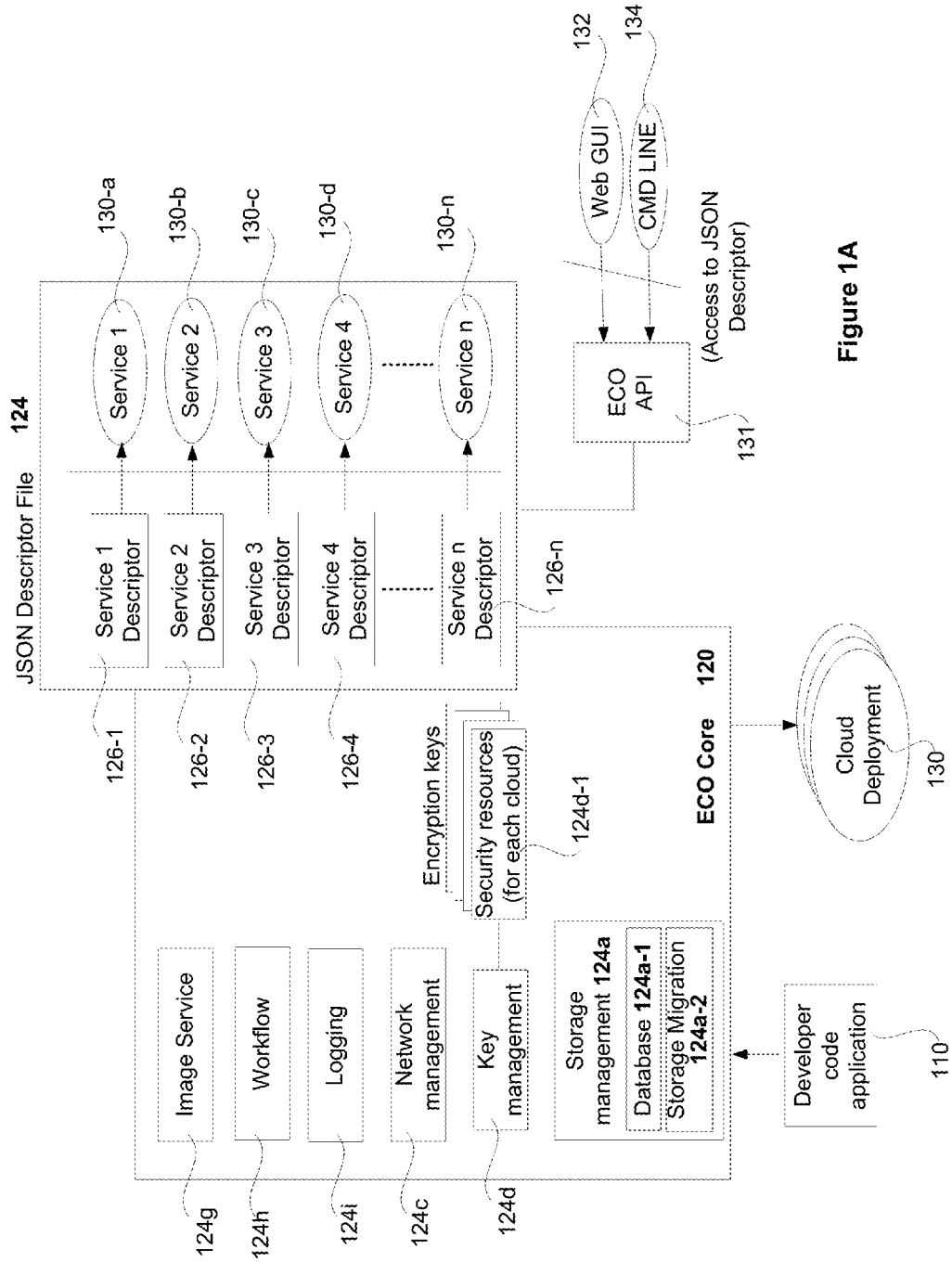
FIG. 1A illustrates a lifecycle of a service (i.e., application) deployed in a cloud system, in accordance with an embodiment of the invention.

FIG. 1A illustrates an exemplary lifecycle of an application 110 deployed for execution in a chosen environment, in one embodiment. As part of the deployment, a JSON descriptor file 124 may be accessed through an API, such as the ECO API 131, using a command line interface 132 or a graphical user interface 134. The JSON descriptor file 124 may be maintained in an environment database and managed by the ECO core 120. The JSON descriptor file identifies a service descriptor record (126-1 through 126-n) for each service environment (130-a through 130-n) defined for an application. For example, as illustrated in FIG. 1A, the service descriptor record 1 (126-1) outlines the resource/service requirements for cloud Service 1 (130-a), service descriptor record 2 (126-2) is specific to cloud Service 2 (130-b), and so on. One or more service descriptor records specified in the JSON descriptor file 124 may be for the same application executing on different cloud services. The service descriptor record specifies the minimal requirement of various resources/services that need to be commissioned for successful execution of the application. The application may be a business application, a video game application, a social media application, etc. The ECO mechanism provides a framework that allows the code of the application to be received into the system, executable instances of the application generated for various environment, the resources/services required for the execution of the application provisioned, the appropriate instance of the application identified and deployed for a specific environment, and the result of the deployment including status of the application and of the provisioned resources/services, reported back.

In one embodiment, a developer of an application may provide the code of the application to the ECO mechanism. The logic within the ECO mechanism may analyze the code of the application to identify the resources that are needed to execute instances of the game in each environment. The ECO mechanism may update the required resource information onto a JSON descriptor file and present the information to the developer for verification and/or update. The developer may edit the JSON descriptor file to update the required resources/services. In an alternate embodiment, all of the resource information in the JSON descriptor file is updated by the developer.

When the application is deployed to a specific cloud service for execution, the ECO core identifies the appropriate descriptor record for the application that is associated with specific cloud service and analyzes the identified service descriptor record to determine the actions that need to be performed, and presents the same to the end user for review. Upon user approval/acceptance/verification, the ECO core initiates the appropriate workflow for provisioning the required resources in the cloud service for successful launching of the application. Results of the actions taken or not taken are logged and periodic report generated providing status of the actions. Based on the status of the various actions, the ECO core may commission additional resources, upgrade one or more provisioned resources, migrate one or more resources, etc. The ECO mechanism effectively manages the life cycle of an entire application, including speeding up the application, if need be.

Figure 1B:
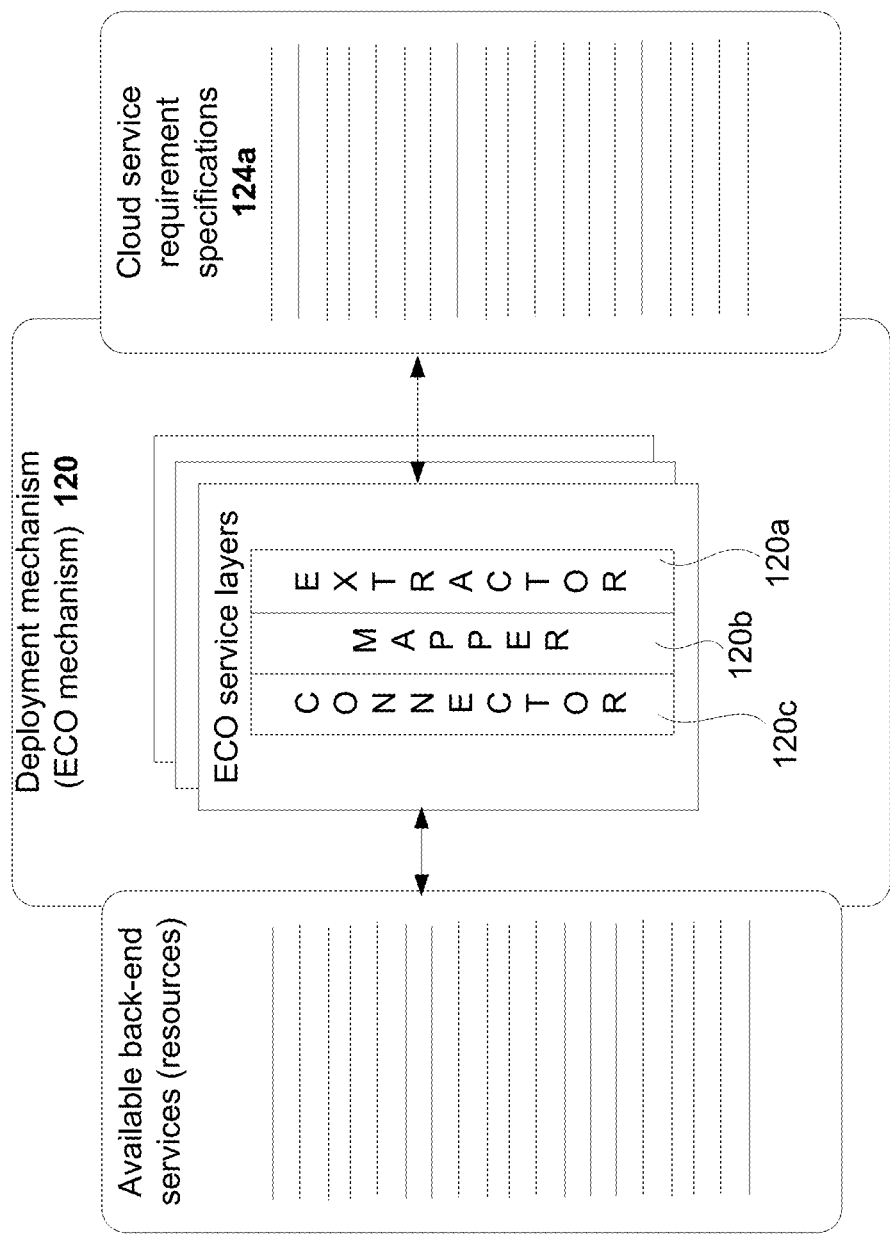
FIG. 1B illustrates a simplified overview of a deployment mechanism, in accordance with an embodiment of the invention.

FIG. 1B illustrates a simplified block diagram of the deployment mechanism. As mentioned earlier, the deployment mechanism includes a set of core service components required on the cloud service, available back-end services and resources, and service layers that act as liaison between the core service component requirements and the available backend services. The service layers provide a layer of abstraction to make the core service components more interoperable and yet replaceable. Specifically, the service layers include logical components to extract the requirements, interpret the requirements, map to available services and resources and connect to the services and resources. Toward this end, an extractor component within the ECO service layers identifies the cloud service requirement specifications 124a defined for a specific cloud service by an application scheduled to execute on the specific cloud service. The cloud service requirement specifications 124a is provided in a descriptor record within a descriptor file. The requirement specifications may be uploaded to the descriptor record maintained in the ECO mechanism manually by a developer of the application. The specifications 124a in the descriptor record are examined to determine what specific resource and services are needed for executing the application. In some embodiments, the requirements may be defined very specifically (for e.g., amount of SDRAM memory of a particular brand or of a particular capacity, etc.) and in some other embodiments the requirements may be defined in a more generic manner (for e.g., defining minimal memory requirements required, etc.).

Using the information provided by the extractor component 120a, a mapper component 120b within the ECO service layers may examine the available back-end services and resources to identify specific ones of the services and resources that meet the requirements for the application.

Once the specific ones of the services and resources are identified, a connector component 120c within the ECO service layers to map the identified services and resources to the application. In one embodiment, the mapping includes determining the actions that need to be performed for provisioning the identified services and resources for successful execution of the application, identifying the appropriate workflows for performing these actions and mapping the identified workflows to the application so that when an instance of the application is to be executed, the mapped workflows are triggered and the appropriate services and resources are provisioned for the application.

After the initial provisioning, the mapper component within the ECO service layers may continue to monitor the resources and services available in the client service to determine if there are changes to the assigned resources and/or services in the client service caused by additions, deletions, upgrades, changes, etc. Based on the monitoring, additional workflow(s) may need to be instantiated to accommodate the change. This may include, for example, running one or more workflows to stop a service, delete a resource, add a new resource, etc. The mapper component may update the workflow mappings for the application to include the additional workflow(s).

The ECO service layers, thus, provide a translation service by translating the requirement specifications defined for an application and mapping to workflows for provisioning the specific resources and services. In some embodiment, the translation service may identify and map to the workflows that provision the exact resources/services specified in the descriptor record and in other embodiments, the translation service may map to the workflows that provision resources/services that are equivalent but compatible to the resources/services required in the specification, thus providing a level of abstraction in the mapping of the specification requirements to the actual services/resources.

Figure 2:
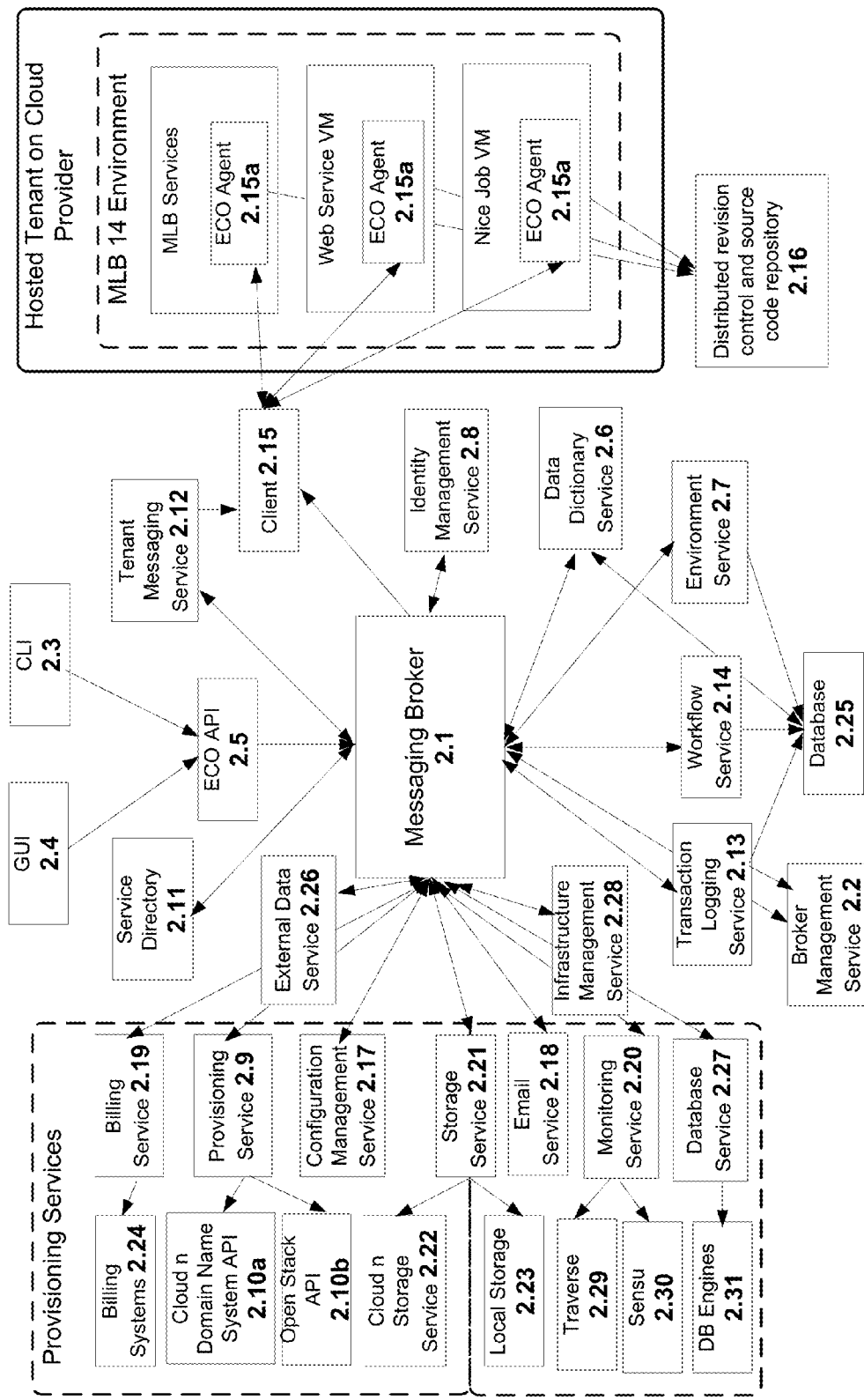
FIG. 2 illustrates service architecture identifying various core service modules and service components of a deployment mechanism, in accordance with different embodiments of the invention.

FIG. 2 illustrates a simplified block diagram of a deployment mechanism's service architecture. The deployment mechanism is a complete multi-cloud hosting management solution. In the heart of the deployment mechanism is a complex and scalable system of interdependent services that communicate with each other through a centralized message broker to exchange information and to coordinate complex orchestration of workflow tasks for executing an application deployed on a cloud service. A centralized set of core service components within the deployment mechanism are responsible for interacting with the end user, managing operational workflows and coordinating communication between the services, application and environments hosted using the deployment mechanism. The functionality of some of the service components within the deployment mechanism will now be described in detail with reference to the exemplary components illustrated in FIG. 2. It should be noted herein that the components illustrated in FIG. 2 are exemplary and that fewer or greater number of components can be included within the core service architecture. As the service requirements change over time, some of the components may be deprecated and new ones may be added to enable provisioning the necessary services/resources defined by the service requirements of the application. The core service architecture provides such flexibility to easily and dynamically adapt to such changing service requirements.

A broker management service 2.2 provides a messaging interface to the messaging broker management through a corresponding API.

The messaging broker 2.1 acts as a communication hub through which the different modules/components of the deployment mechanism provided in the ECO system communicate with one another to transmit service requests, provision services, update the descriptor record, configure the services/resources, instantiate application, identify actions, instantiate workflows, receive status information, and other operations that are required for the successful execution of the application in a defined environment (i.e., cloud serving infrastructure). The messaging broker 2.1, for example, may facilitate interactions between the different components with workflow service 2.14 that includes logic to intelligently predict the sequence of the different tasks based on the application requirements and service/resource interdependencies. The messaging broker 2.1 effectively allows for exchange of messages about the different provisioned resources/services so as to gather information related to resources/services provisioned and the corresponding performance status information, which is then used to determine if the provisioned resources/services meet the required performance criteria defined for the application. Toward this end, the messaging broker 2.1 may facilitate the Monitoring Service 2.20 to periodically exchange messages with a Provisioning Service 2.9 to request and obtain information related to the various resources/services that are provisioned for the application to determine if the resources/services are performing in an optimal manner.

The messaging broker 2.1, for example, provides the conduit for the Infrastructure management Service 2.28, Configuration Management Service 2.17, Environment Service 2.7, Billing Service 2.19, Provisioning Service 2.9, Monitoring Service 2.20, Sensu™ component 2.30, etc., to coordinate exchange of messages with one another. In one embodiment, the Sensu™ component 2.30 may monitor the health of all instances of resources and/or services for an application and will generate a signal to notify the ECO mechanism to take appropriate actions if any pre-defined thresholds are reached. The ECO system will then execute a set of predefined rules to determine if an instance or the resource/service needs to be replaced (as part of auto healing, for example) or scaled up or down (as part of auto-scaling, for example). Accordingly, messages may be exchange to obtain information related to available resources/services in different cloud service environment and their cost and/or performance in order to determine if equivalent resources/services that are more cost and/or performance effective are available within a desired cloud service environment. Such information may be used to effectuate a switch in the resource/service, if need be, to provide optimal environment for application execution. The message exchanges facilitated by the messaging broker with various service modules (such as Monitoring Service module 2.20, Provisioning Service module 2.9, etc.) may be used to determine if the provisioned services/resources are sufficient to enable optimal execution of the application in the cloud service environment or if additional/alternate resources/services need to be provisioned to allow optimal execution of the application. In some embodiments, based on the information related to the performance of the resources and/or services, the messaging broker 2.1 may coordinate exchange of messages between the Infrastructure Management Service 2.28, a Broker Management Service 2.2, Environment Service 2.7 to enable dynamic switching/provisioning of relevant resources/services to optimize the execution of the application. Such status checking and switching may be done while the resources/services are being provisioned before executing the application, during the execution of the application, and/or after the application has finished executing. In some embodiments, the switching may be caused by a change detected in the provisioned resource/service within the environment. The changes may be caused by upgrades to the existing resources/services, removal of a provisioned resource/service, addition of newer yet compatible resources/services with improved performance, etc. When such changes are detected in the environment, corresponding service modules may generate appropriate signals and transmit those signals in the form of messages to the Messaging Broker 2.1 and the Messaging Broker 2.1 directs these messages to the relevant service modules to allow the relevant service modules to take proactive steps to address any potential issues and/or resource/service discrepancies that may be caused by the change. In one embodiment, the messages are fetched/pulled by the appropriate resources/services from the Messaging Broker. In other embodiments, the Messaging Broker delivers the messages to the appropriate resources/services that are subscribed to receive the messages. The messages that are pulled/delivered include data provided by the various components of the ECO system and include information related to services/resources that are to be provisioned.

The auto-scaling or auto-healing functionality provided by the Monitoring and Workflow service components may, in one embodiment, engage a set of rules to provision a service or resource. The rules may be administered by users via the descriptor record. The rules may be evaluated in accordance to the auto-healing or auto-scaling functionality based on the message from the messaging broker (sometimes in a repeated fashion). During the evaluation, when the rules are matched by the appropriate criteria, selected workflows may be executed.

The rule set provides the users with the ability to build business logic directly into the environment that they desire the application to execute. The rules engine provides the ability to detect and signal in a service separate from the workflow operations that take action, especially when a component needs to be modified/replaced. In some embodiments, the Messaging Broker 2.1 may send message related to a component that needs to be modified/replaced to the Monitoring Service logic 2.20. The Monitoring Service logic 2.20 includes a number of methods that receive messaging events from the Messaging Broker of the ECO system and logically determines the appropriate actions that need to be taken and sends out appropriate messages to the Workflow service module 2.14 to implement those actions. The actions that are taken may be of different types, including process actions types and status action types. Some exemplary process action types include actions, such as create, read, update, delete (CRUD) actions. The action types listed herein are exemplary and should not be considered exhaustive. Other action types may also be considered in accordance to the rules. The response/status on the actions taken may be analyzed and interpreted into messages that may be directed to different components within the ECO system. The messaging broker receives these messages from the Workflow services 2.14 and makes decisions, according to the rules specified in the rules engine, on where, when, and how to send the message for further processing.

In addition to the standard monitoring provided by the Monitoring Service 2.20, an Enhanced Monitoring service may also be engaged. The Monitoring service in coordination with the Sensu™ component 2.30 may be configured to generate messages that are directed toward creating/editing/deleting some objects/tests/thresholds/alerts and includes the ability to receive signals that indicate alert identifiers and threshold events. The Monitoring service may be integrated with the standard monitoring service 2.20 allowing the ECO system to manage monitoring for its environments and respond programmatically to monitoring events (such as thresholds).

In one embodiment, the Monitoring service provides the ability to use the Monitoring mechanism as the "detection" mechanism in auto-scaling and auto-healing workflows. In another embodiment, the ECO system uses a script for provisioning common application-related monitoring objects. The monitoring service is configured to remove the dependency from ECO system and replace the logic/rulesets that are embedded in the script with native ECO functionality so that monitoring using plurality of monitoring services may be uniformly implemented. The monitoring service also standardizes the way ECO provisions/manages monitoring for any current or future service, making the enhanced monitoring more predictable and adaptable to change.

One of the components that is used to provide the auto-healing/auto-scaling functionality is a load-balancer service component. This ECO enabled load balancer can be programmatically controlled. A separate load balancer (LB) record may be referenced by the descriptor record associated with an application and a user may be provided with the appropriate user interface to populate the necessary parameters to provision/manage a software-based load-balancer in the cloud. The LB record may identify multiple components, including load balancer component, API, etc., that are orchestrated by the ECO system's workflow and rules engines. By adding load balancer as a service type in the descriptor record, many points of configuration can be directly managed by the users. By permitting API control of Load Balancer components, the ECO system can instantiate simple and advanced workflows that scale and heal application stacks based on programmatic events. To allow easy reuse of advanced configurations, templates may be used to describe explicit profiles for the target load-balancer to adhere. Additionally, the load balancer service component is configured to send status signals to both internal and external monitoring services.

In some embodiments, the workflow service 2.14 may engage a service to manage the domain name system (DNS) resources for the ECO system by managing internal application stacks and DNS records for all existing public domains.

In some embodiments, the auto-healing and auto-scaling related modules may engage the workflow service 2.14 to keep track of the usage pattern of the resources/services during execution of the application for a particular geo location and/or over different times, and use the information gathered from the usage pattern to intelligently predict the demand of the application for the geo location or for specific time periods. Based on the prediction, the auto-healing/auto scaling related modules may engage provisioning service 2.9 to broker the appropriate resources/services to make it cost and/or performance effective and provision the same in time for servicing subsequent request(s) for executing the application in the environment. In some embodiments, the auto-healing/auto scaling related modules may even broker the appropriate resources/service from an environment that is different from an existing environment to requisition the required services/resources to enable the application to successfully execute. In some embodiments, once the required resources and/or services are identified, the auto-healing/auto scaling related modules together with the provisioning service 2.9 and workflow service 2.14 may determine any interdependencies that may exist in relation to the different resources and/or services required for the successful execution of the application, and define the sequence for provisioning the required resources/services. The messaging broker 2.1 acts like a traffic controller in a centralized hub of the ECO environment controlling the messages to and from different service modules within the ECO system in order to fulfill different resources/service requests and needs, and to initiate a desired sequence of workflows to service the requests. It should be noted that the messages exchanged between the various components/services through the messaging broker 2.1 of the ECO system may include data related to status, flags (including success flags and failure flags), comments, errors, requests, and other pertinent information required for provisioning services/resources for successful execution of the application.

Command line interface (CLI) 2.3 and graphical user interface (GUI) 2.4 provide alternate front end user interfaces to ECO API 2.5 to allow for end user interaction. The ECO API 2.5 is a service which translates hypertext transfer protocol (HTTP) requests into appropriate messages to make service operation requests and such messages may follow specific protocols in relation to format and transmission. The CLI 2.3 dynamically queries Service Directory service 2.11 through the ECO API 2.5, Messaging Broker 2.1 and builds its commands based on what service operations are available. The GUI 2.4 is basically a graphical editor that interacts with the ECO API 2.5, displays different environment descriptor fields and allows end users to manage the environment descriptor by allowing the end users to define metadata values for each existing environment descriptor field, to add new fields and to support workflow service scripts.

The Data Dictionary service 2.6 manages metadata describing the various fields used within the environment descriptor. One of the purposes of the Data Dictionary service 2.6 is to support the dynamic display of environment descriptor fields in the graphical user interface 2.4 and to allow end users to define metadata for each field and to add new fields. The metadata defines how fields are displayed, validated, and changed in the GUI, as well as the source of initial default data, field labels for translation.

ECO API 2.5 provides an interface for brokering HTTP (HyperText Transfer Protocol,—including proprietary and non-proprietary protocols) requests to the services supported by the ECO mechanism (i.e., ECO services). Its basic purpose is to take the request URL and translate each request into an appropriate messaging request for the specified service operation. Each request translation is performed by applying certain business logic, and returning an HTTP response in the form of message response. End users are allowed to query the Service Directory 2.11 using the ECO API 2.5 via the CLI 2.3 or GUI 2.4 to see what services are available, what operations are supported, what parameters can be used, and what information the end user can expect to be returned.

The end users interact with the GUI or CLI to submit requests to the ECO API 2.5. The ECO API 2.5 translates these requests and engages the ECO Messaging Broker 2.1 to forward the requests to the respective ECO services/resources. In one embodiment, the services may include a cloud service or any other service provided within a cloud service. In one embodiment, the messaging broker 2.1 of the ECO API has built-in logic that is able to understand the multiple different "languages" (APIs) used by different cloud services, and translates the request directed to a specific target cloud service appropriately. The ECO API, thus, allows the end users to manage the different services using a single API by engaging the messaging broker 2.1 that acts as a translator and a manager allowing interactions with multiple services. For example, if a request involving a single cloud service is received at the ECO API, the Provisioning Service 2.9 within the ECO will simply translate the request into an API request that the target cloud service will be able to interpret. The Provisioning Service 2.9 then transmits the translated API request to the appropriate target cloud service for processing. If the request is more complex and requires coordination between multiple cloud services, the workflow service 2.14, will apply business logic to determine exactly what steps need to be taken and in what order and engage the different services/resources to implement the steps in accordance to the order defined in the applied business logic.

The Workflow Service 2.14 stores predefined rule set and workflow information and is able to break down complex requests into detailed steps that must be taken in a specific order. For example, the request might be a simple "spin up a second production environment" request. Although the request may appear to be a simple request, a plurality of small steps may be required to make this request happen. For instance, a given production environment may consist of a plurality of machines (including virtual machines). As a simple example, the production environment may have 10 virtual machines. The business logic within the Workflow service 2.14 may break down the request into smaller requests and establish the sequence that needs to be followed for carrying out the request. In this example, the request is broken down into 10 separate requests, with each request provisioning a distinct virtual machine within the production environment, followed by 10 separate additional requests, with each additional request deploying the correct software on each virtual machine.

The Environment service 2.7 is used to create and update environment definitions (also known as "environment descriptors") and implement business rules to maintain consistency and versioning when managing environment data. The versioning is especially helpful during data (environment and other data) retention and restoration. The environment descriptor data includes the necessary information to identify the environment, what cloud tenant(s) the environment is running in, the number of machines and services that are engaged, configuration data of each machine engaged, etc. The environment data information is stored and/or backed up to the database.

The Identity Management service 2.8 manages users, roles and organization related information for each service from within the deployment mechanism. This is the basis for governance within the system which protects access to service operations, applications and their environments to appropriate users with the authorized permissions and access levels.

Provisioning service 2.9 provides a front end service layer to the different cloud service providers, as well as different backend infrastructure services. The Provisioning service 2.9 provides a unified interface for creating virtual machines from multiple clouds. In one embodiment, DNS service 2.10*a* and open stack API 2.10*b* are part of the Provisioning service 2.9. In this embodiment, the Provisioning Service 2.9 is used to provide a front end service layer to one or more cloud service providers, the DNS service API 2.10*a* and Open Stack API 2.10*b* provide the interfaces to redirect backend infrastructure services. The DNS service 2.10*a* is used to assign DNS host names to environments hosted in the ECO system and manage all DNS modification needs within multiple systems.

The Service Directory 2.11 provides a dynamic index of available ECO services upon request. The purpose of the Service Directory 2.11 is to effectively provide a Service registry and can programmatically reveal the services available for invocation to other services within the ECO service oriented architecture (SOA), as well as their engagement methods. The CLI 2.3 queries the Service directory 2.11 to determine which services and operations are available to the user and the Service directory returns the services, along with their service operations, options and other details, in response to the queries. As and when services are implemented within the ECO architecture, each of the services are registered in the Service directory 2.11 so that they can be discovered and returned, in response to any requests received from the CLI 2.3.

The Tenant Messaging service 2.12 provides functionality to query, communicate and execute with the host machines that are being managed by ECO. These can be machines that were originally provisioned in the cloud by ECO system or existing cloud-based or physical machines which have been imported into the ECO system.

The Transaction Logging service 2.13 is used to log all transactions that are happening within the ECO system between the ECO and the hosts it manages, typically as a result of running asynchronous workflows.

The Workflow service 2.14 provides the functionality for orchestrating a set of tasks, such as download software, configure the software, start up the software, deploy service, etc., for specific actions defined by the request received from the CLI/GUI. The Workflow service 2.14 contains multiple worker queues from which job workers can be spawned for simultaneous management of jobs. When initiated through the ECO API 2.5, the Workflow service 2.14 can retrieve environment data from the Environment service 2.7 and issue commands/actions through the Tenant Messaging Service 2.12 to perform required actions on the host machines being managed by ECO (e.g., replicate an environment, provision servers, start/stop services, deploy services, etc.). Of course, the commands/actions may be transmitted from the Workflow Service 2.14 to the Tenant Messaging service 2.12 through the messaging broker 2.1. Resultant information, such as status, software and version, IP addresses, etc., are communicated back to the Environment Service 2.7 for updating the environment configuration data with correct values (if any). As part of running the workflow, the last step that the workflow service 2.14 does is to update the environment configuration data to match the current published version, since the published version will have changed by provisioning and service activation.

The Workflow service 2.14, in one embodiment, may contact and communicate with services, such as cloud services, outside of the ECO mechanism through internal ECO services facades to use resources from those services as needed. For example, this feature allows for creation of hybrid hosting solutions that can be controlled from within the ECO mechanism. The computing resources, in this example, may be leveraged from a first cloud service while storage may be leveraged from a second cloud service, etc. In another example, this feature assists in supporting a burst out use case, where under heavy load, an environment provisioned by ECO in one cloud provider (or cloud service) could burst out onto another cloud provider for additional resources for a temporary time period needed to handle the heavier load, and then release those resources when the load drops back to nominal levels.

The Workflow service 2.14 provides workflow syntax to execute commands that initiate actions. As the application configuration scripts hold most of the programming required for execution of such commands, the Workflow service 2.14 provides the ultimate goal of allowing the applications to control their own configuration and define custom workflows, as needed.

The Distributed revision control and source code repository 2.16 is used as a source code management system for end users Application Configuration Management (ACM) scripts, along with the core set of services and the framework used to execute the script.

The Tenant Messaging service 2.12 provides a framework for executing parallel job execution systems on the managed host servers. The framework uses a distributed, agent-based architecture for executing actions on clusters of servers. In one embodiment, the command structure within the Client is separate from the underlying transport mechanism. The messaging protocol used by the Client can be leveraged by the transport mechanism.

The Client 2.15 receives a set of commands from the Tenant Messaging service 2.12 (through the messaging broker 2.1) to perform one or more commands and, in response, sends messages to the remote host servers, which each contain an ECO agent 2.15a. The commands may be related to replication of an environment, starting/stopping services, deploying services, etc. Although a single reference numeral 2.15a is used to identify the ECO agents in the different host servers (such as Game Services server, Web Service VM server, "Nice Job" VM server, etc.), it should be understood that the client agents 2.15a deployed on different servers may be specific to the respective server. The ECO agents are responsible for doing all local work within the respective servers, while the Workflow service is used for orchestration of tasks across all servers/client services and for coordinating the actions across local hosts. The Client agent 2.15a listens for commands from the Tenant Messaging service 2.12, performs one or more actions, and then reports back when the task/action is complete.

Messaging Broker 2.1 is an implementation of a messaging protocol that enables the communication between various ECO services through the sending and receiving of data as binary messages. Messages can be one-to-one or one-to-many and supports use of different protocols within the message payload for communicating between system components. The use of messaging at the core of Service Oriented Architecture (SOA) allows for the system to be loosely coupled and to expand over time with minimal change required to the rest of the system.

The messaging protocol enables client applications to communicate with messaging middleware brokers to request services from service provider applications. It also allows for service to service communication and for event messages to be published for asynchronous processing. Messaging brokers 2.1 receive messages from applications that publish messages to request services (for e.g., producer applications) and route them to service applications that consume these messages and provide those services (for e.g., consumer applications). In one embodiment, the messaging brokers 2.1 deliver messages to consumers subscribed to queues. In an alternate embodiment, messaging brokers 2.1 allow consumers to fetch/pull messages from queues, on demand.

The messaging protocol provides an abstraction layer that is built up with exchanges, so that messages can be routed separately. Messages are published to exchanges. From the exchanges, the messages are routed to various queues based on routing patterns contained in message headers. Queues store messages that are consumed by applications. In this way, exchanges act as post offices and queues as mailboxes. Service workers are distributed across queues to receive messages and can be scaled up or down, on demand. The queues are backed up to disk and used in disaster recovery. For example, in a disaster scenario users can pick up right where they left off when the system gets restored. Message delivery acknowledgement also helps prevent message failures.

A separate service exchange (not shown) and event exchange (not shown) are used for separation of messaging, with considerations over security and traffic shaping. The different exchanges can be easily managed to handle load balancing, optimize performance, improve latency, and increase usable bandwidth. The service exchange is where the clients send their service request messages intended for the ECO services. In one embodiment, the exchanges are defines as logical groupings of queues that are maintained and managed by the broker. The service exchange is a grouping of service operation request messages and the event exchange is a grouping of asynchronous signals that are targeted to be sent to various components within the system.

Environment-specific exchanges provide security and application environment isolation. This ensures that the right messages are being routed to the correct set of host machines which make up an environment. Users can similarly isolate where their messages, which could potentially contain sensitive environment data, are going and prevent other environments from listening to these messages.

The Database 2.25 provides a non-SQL solution for data storage, where environment data is managed in the form of document objects (JSON-like blocks), which are essentially a collection of key-value pairs. In one embodiment, the database 2.25 is configured to store data related to the different environments in which the application is designed to execute. Its purpose, in one embodiment, is to collect and store data from the Transaction Logging service 2.13, Workflow service 2.14, and Environment service 2.7. Other information related to the environment and application may also be stored in the database 2.25.

External Data Service 2.26 is a service component which communicates with other systems to exchange data such as title information from the Master Product Management system (not shown). The External Data service 2.26, in one embodiment, will grow over time as data is exchanged, as needed, with other systems.

Database Service 2.27 provides Database as a Service functionality to allow applications to manage their own databases. Similarly, Monitoring Service 2.20 will provide Monitoring as a Service functionality by integrating with external systems like Traverse™ 2.29 and Sensu™ 2.30, which are responsible for monitoring host systems that are managed by ECO. Sensu™ 2.30 is part of the monitoring service 2.20 and includes a routing agent that is configured to monitor application execution and system services using "check" scripts, collect metrics in different formats, and send notifications for different events (including service failures) in different formats and media. The API within the monitoring routing agent provides access to various event and agent related data so as to check executions and for resolving events across the various system services. Additional logic and business rules are wrapped over the functional logic provided by the Sensu™, within the ECO system in order to provide and manage auto-healing and auto-scaling functionality.

The core service components of the deployment mechanism communicate with the backend services through the ECO façade service layers. The facade services act as liaisons between the core services and the back end services and provide a layer of abstraction to allow for the backend services to be interoperable, replaceable and can provide ECO system ECO specific business logic, as needed. The façade services are integrated within the deployment mechanism (also referenced as "ECO core") and respond to the same type of message-based service requests as the other ECO core services. As mentioned earlier, the scalable framework allows new technologies to be abstracted by façade services and integrated into the Cloud ECO system without affecting the core set of ECO services. Some of the services that are provided in the deployment mechanism include Email service 2.18, Billing service 2.19, Monitoring service 2.20, Storage service 2.21, Configuration Management service 2.17, etc.

Email service 2.18 is used to plug into the existing email infrastructure for messaging purposes.

The Billing service 2.19 runs a live billing feed that will be used to capture environment resource usage for the existing billing system 2.24, including instance uptime, processor usage, memory usage, etc. The Billing service 2.19 contains a collection agent for retrieving usage data and a billing API for sending usage data to the existing billing system.

At regularly scheduled intervals, a Billing service agent sends a message to query for usage data. As usage data is received, it is sent to a specialized database (not shown). The usage data is then pulled from the specialized database to an operational data store (not shown). From here, an ETL (Extract, Transform and Load) process pulls the data into a data warehouse for billing and reporting.

In one embodiment, the Billing service 2.19 may be used by the ECO mechanism to compare cost of services, generate performance and cost metrics, track cost of each resource and to change its gearing or floating the various services for cost optimization. The floating of services includes migrating from one service environment to one or more of other service environments for optimal execution of the application. In order to track cost and to accomplish cost optimization, the ECO system may collect and analyze the various billing and metering data periodically, and may, in one embodiment, query and receive feedback from different cloud services to determine cost of the resources and automatically determine, in the backend, the environmental profile of the application. The environmental profile of the application may be categorized as an expensive profile, a frugal profile, a moderate profile, etc. Based on the environmental profile and based on a set of pre-defined rules (for e.g., rules associated with performance, cost, resource usage, etc.), the ECO system may determine which service(s) to use to obtain cost and performance optimization.

The Monitoring service 2.20 will be used to monitor the health and performance of services running in the environments hosted in the deployment mechanism platform as a way to centralize the information regarding alerts, escalation, and communication pertaining to monitoring of a service stack. For example, the Monitoring service 2.20 may monitor the health of the services and detect a spike in traffic for the application within the environment at a particular geo location or at a particular time period (for e.g., time of day, time of week, etc.). Based on the monitoring, the ECO system may determine that a single instance of the application may not be enough to handle the traffic and may intelligently add one or more additional instances of the application to handle the traffic. The ECO system may receive messages from the Monitoring service 2.20 and, in response to the received messages, may perform this by instantiating additional application instances, adding these application instances to the descriptor file, and mapping to the required resources to let the application perform optimally. Providing additional instances of the application is one way of optimizing the performance of the application. Other ways of optimizing the performance of the application may be to provide additional resources, upgrading resources, changing resources, migrating the resources, etc., within the environment for the application to use. In one embodiment, the monitoring is done at the organization level. In another embodiment, the monitoring is done at the application level. The Monitoring service 2.20 builds a dynamic document based on the information provided in the environment descriptor and feeds that information to a resource management module in order to provision/de-provision monitoring rules, alerts, etc. In other words, the data from the Monitoring service 2.20 are used by the ECO system to effectively manage the life cycle of an entire application/service, including speeding-up the application/service if need be. The ECO system does this by continuous monitoring of the application/service and efficient management of the resources for the application/service.

Configuration Management system (CMS) service 2.17 is used for automating administrative tasks and configuration management based on centralized specifications, and especially managing the operating system and application prerequisites on hosts targeted by ECO core. The CMS is implemented as a way to perform policy-based configuration management that can be audited and utilized by certain core group of users, such as Information Technology and Information Security staff. The CMS, in one embodiment, uses a series of hierarchical manifests to deliver instructions to individual hosts. In one embodiment, the CMS is integrated into a private cloud, such as Open stack private cloud.

Storage service 2.21 provides a front end service layer to one or more cloud storage services 2.22 and local storage back end services 2.23, in one embodiment. The Storage service 2.21 is a combination of a policy engine and a facade service that are used to interpret stated storage needs from the environment descriptor and deliver results against multiple storage back ends. It not only provides the ability to provision storage, but also maintains policies/rules describing how an application handles data storage over time. In this embodiment, the Storage service 2.21 is a distinct stand-alone service component within the ECO core. In another embodiment, the Storage service 2.21 is integrated with the Infrastructure Management service 2.28. The policy engine is fed to the environment descriptor to manipulate workflows and storage endpoints to effect changes on the systems that match the policy rules.

It should be noted that the services that were described with reference to FIG. 2 are exemplary and should not be considered limiting. In some embodiments, one or more of the services/resources may be integrated with other services/resources to define integrated services/resources. As a result, the functionality or attributes of such integrated services/resources may be combined. Additionally, it should be noted that not all services/resources need to be provisioned for an application. One or more services/resources may be adjusted or configured to add additional functionality or additional resources/services may be introduced to provide additional functionality within the ECO system. Since the ECO mechanism provides a scalable framework such configuration changes can be done easily and seamlessly without affecting the performance of the application or the core functionality of the system.

The various services/resources available within the ECO system and required by the application are described in an environment descriptor record within an environment descriptor file that is maintained within the ECO system. The environment descriptor file is a JSON-formatted file that provides an interface for application software management within the ECO system. The environment descriptor record within the environment descriptor file is a representation of what is required to be configured in a remote cloud tenant or physical hosts for successful execution of the application in the tenant environment.

In one embodiment, the environment descriptor record contains list of parameters that is needed to run the application. The descriptor record contains definitions and specifications of resources/services for a particular environment, including databases, virtual machines, services and software, storage locations, ACM (Application Configuration Management) configuration, CMS (Configuration Management Service) configuration, and other environment metadata.

The ECO GUI 2.4 is able to dynamically configure its available menu actions based on the actions that are specified and stored within an environment descriptor. For example, when a "start" button is clicked in the GUI, a "start" action is passed an ECO API call. In response, an ECO workflow registered to handle "start" will be executed, which will ultimately include a call to the "start" functionality of the ACM on the one or more host instances, where the ACM initiates and executes the action. The environment descriptor acts as the interface between the ECO system and the ACM. By specifying the appropriate ACM in the environment descriptor, the ECO system is made aware of where to obtain the specified ACM, where to put the ACM on different machines within the environment, and what ACM commands are available to be used. The actions specified in the environment descriptor trigger specific workflows within the environment to allow provisioning of the necessary resources, services, and/or applications.

In one embodiment, the ACM includes a manage script logic that is used for deploying applications to the appropriate environment within the ECO system. The ACM script is an interface to the application to know how to start/stop/update/restart/check_status of an environment. The ECO system provides default generic workflows within the ECO system that will orchestrate these actions. The developer defines what the details of the workflow for a specific application, which involve the coordination between the application's ACM and the environment descriptor.

The ACM script may also specify backend tasks. The backend tasks that are run during a given ECO workflow depend, in part, on what is defined in the environment descriptor. For example, in a "publish" workflow, the ECO system will run specific ones of tasks depending on what has changed in the environment descriptor. If the environment descriptor has been edited to add a new machine, then the ECO system will identify and execute the task/action for launching a new machine via the Provisioning service 2.9. If the environment descriptor has been edited to change the CMS repository information and/or Distributed Revision Control and Source Code repository 2.16, and machines are already running in the environment, then the ECO system will skip the action for initiating the provisioning process, identify and initiate the action to just update the software on the affected service(s) within the environment.

The ACM is deployed on each machine and executes all of the steps needed to install and configure an application. An ECO workflow will call an appropriate ACM for the environment in which the application is to execute, and associate a given action. The ACM references the environment descriptor for the environment information, makes decisions about what needs to be done on that particular host based on the logic defined within. The logic specifies what configuration files need to be changed, how the files are to be changed, what resources are available within the host, how many services there are per host, etc.

In one embodiment, when a machine is to be provisioned, a user may specify, using the GUI 2.4 or the CLI 2.3, identifies a cloud service on which the machine is to be provisioned and provides instructions to the cloud service to create a machine based on information about the machine obtained from the environment descriptor. In an alternate embodiment, when the machine is to be provisioned, logic within the ECO system may identify, with some interactions from the user, a cloud service on which the machine is to be provisioned, identifies the appropriate environment descriptor record, and provides instructions to the cloud service to create the machine in accordance to the information from the environment descriptor record. The information feed translates into a machine launched from the cloud service. As part of the provisioning process, the ACM is installed on the launched machine based on specifications in the environment descriptor. Then, the Configuration Management service (CMS) 2.17 is run to contextualize the machine. The CMS plays the role of systems configuration management. Specifically, the CMS prepares the instances (in the cloud) for use with ECO by ensuring that all of the pre-requisite software, settings, and permissions are in place and are relevant to specific data center/location of the instance in question. Any of the available configuration management software may be employed for this role. In accordance to this role, the contextualizing involves installing all of the packages (software and others) that are associated with the role of that machine. After the contextualizing is completed, the ACM is instructed to parse the environment descriptor to check out the code base, verify dependencies are met, and execute all of the details about the application.

In other words, the ACM translates the command issued by the ECO system using the logic built within. If the command is to start a service on a machine, the built-in logic of the ACM knows what arguments are needed to run the command, specific way to run the command with the arguments for the service (each service may have different ways of running the command), define sequence of running the various tasks associated with the command, etc. The ACM identifies the type of environment on which it is starting the service by referencing the environment descriptor for the specific environment and builds the service using the configuration files.

The environment descriptor file is a JSON-formatted file that provides an interface for application software management in ECO systems. The environment descriptor file is a representation of what has been configured in the remote cloud tenant for executing the application.

The environment descriptor file contains a descriptor record with a list of parameters that are needed to run the application. For instance, the descriptor record may contain definitions and specifications for a particular environment including databases, virtual machines, services and software, storage locations, ACM configuration, CMS configuration, and other environment metadata. The environment descriptor record needs to be in place and the ACM manage script defined in an "eco" block of the environment descriptor record before the ACM can be created. This is so that the ACM can use the configuration information specified in the environment descriptor record for configuring the environment. The environment descriptor record, thus, includes all the information about all the services that is needed to configure the environment and defines the actions that are supported in the application's ACM. The eco block provides information on where to obtain the application's ACM, how to run the ACM and the ACM-supported actions that should be executed during an ECO workflow. When executed, the ECO workflow calls/initiates the ACM for a stop/start/update/check/etc. The workflow will contact the machine on which the ACM needs to be run, run the ACM manage script and provide the necessary arguments to run the ACM. A sample eco block pseudo-code is provided below.

```
"eco": {
    "puppet_environment": "production",
    "acm": {
        "app_stack1": {
            "git_dest": "/home/acm1/path",
            "git_repo": "git@github.com:example/project1_acm.git,
            "git_ssh_key": "id_rrsa-eco-deployment",
            "git_treeish": "master"
            "manage_script": "/home/acm/path/script.sh"
        }
    ",
    "actions": {
            "restart": "restart",
            "start": "start",
            "stop": "stop",
            "update": "update",
            "wipe": "wipe"
    },
    "format_version": "1.4",
}
```

A sample eco block pseudo-code for defining virtual hosts in the environment of a cloud service is provided below. The machines block may include information provided by a cloud service provider, information from services, machine-specific metadata per service, and other configuration attributes.

```
"machines": [
    {
        "name": "value_hostname1",
        "availability_zone": "value_zone",
        "tenant_name": "value_tenant_name",
        "flags": {
            "attribute1": "value1",
            "attribute2": "value2"
        },
        "flavor_id": "01",
        "floating_ip": "123.123.123.123",
        "image_id": (abcdef12-abcd-abcd-abcd-abcdef123456),
        "security_groups": [
            "security_group_name1",
            "security_group_name2"
        ],
        "services": {
            "app_stack1": {
                "service1": {
                    "s_configu1": "value1"
                }
            },
            "app_stack2": {
                "service1": {
                    "s_config1": {
                        "array1": [
                            "a_value1",
                            "a_value2"
                        ]
                    }
                }
            }
        }
```

```
        },
        "puppet_role": "role::org::project",
        "user_data": ""
    }
]
```

A sample eco block pseudo-code for defining each type of service and repository information, per application stack, is provided below. The ACM may use the repository information to get the latest application code. One or more attribute features can be used to differentiate one service from another service within the environment, when more than one service has the same name.

```
"services": {
    "app_stack1": {
        "service1": {
            "bootlevel": 1,
            "git_repo": "git@github.com: example/project1_name.git",
            "git_revision": "",
            "git_treeish": "master",
            "attribute1": "value1",
            "attribute2": "value2"
        }
    },
    "app_stack2": {
        "service1": {
            "bootlevel": 1,
            "git_repo": "git@github.com: example/project2 name.git",
            "git_revision": "",
            "git_treeish": "master",
            "ssl_port": "443",
            "port": "80",
            "attribute1": "value1",
            "attribute2": "value2"
        }
    }
}
```

A sample eco block pseudo-code for defining remote storage information for the application is provided below.

```
"storage": {
    "app_stack1": {
        "service-provider_access_key_id": "ABCDEF1234567890ABCD",
        "service-provider_secret_access_key":
        "abcdefghijklmnopqrstuvwxyz1234567890+/-!",
        "asset_bucket": "bucket_name",
        "provider": "example-1"
    }
}
```

The pseudo-code provided above for inclusion in the eco block for provisioning services/resources is exemplary and should not be considered restrictive. Other ways of provisioning services/resources within the eco block may be used. The software source code for an application may be stored on a web server in the cloud provider tenant, in a source code repository or in any location that is accessible to the machines on which the code is to be downloaded. The ACM is updated to identify the location.

When any fields in the environment descriptor are changed, the changes can be published using a "Publish Environment" option, in one embodiment. Alternately, an update may be run to deploy the changes to the different services in the environment. When the update option is selected, an update software updates the application software with the latest revisions, updates the environment descriptor to reflect the changes, pushes out the updated environment descriptor on all machines, and finally updates the ACM.

When the publish option is selected, a publish preview window (i.e., GUI) displays details of what has changed between the current environment version and the updated environment version. Additionally, a "Publish Environment" workflow is executed. The workflow identifies and runs a string of actions that includes updating application software. For example, in one embodiment, the following actions may be executed by the publish environment workflow: 1. Commit the environment draft version; 2. Log the current service state and deployed revision in the environment; 3. Check for machines to terminate and check that all DNS records are valid; 4. Provision new machines and verify that existing machines are running; 5. Update new DNS records on machines and check/add floating IP addresses; 6. Update ACM on machines; 7. Update application software; and 8. Set the last published environment version. The aforementioned list of actions is exemplary and fewer or additional actions may be executed based on the update. In some embodiments, a plurality of workflows may be deployed in parallel to complete the identified actions.

Figure 3:
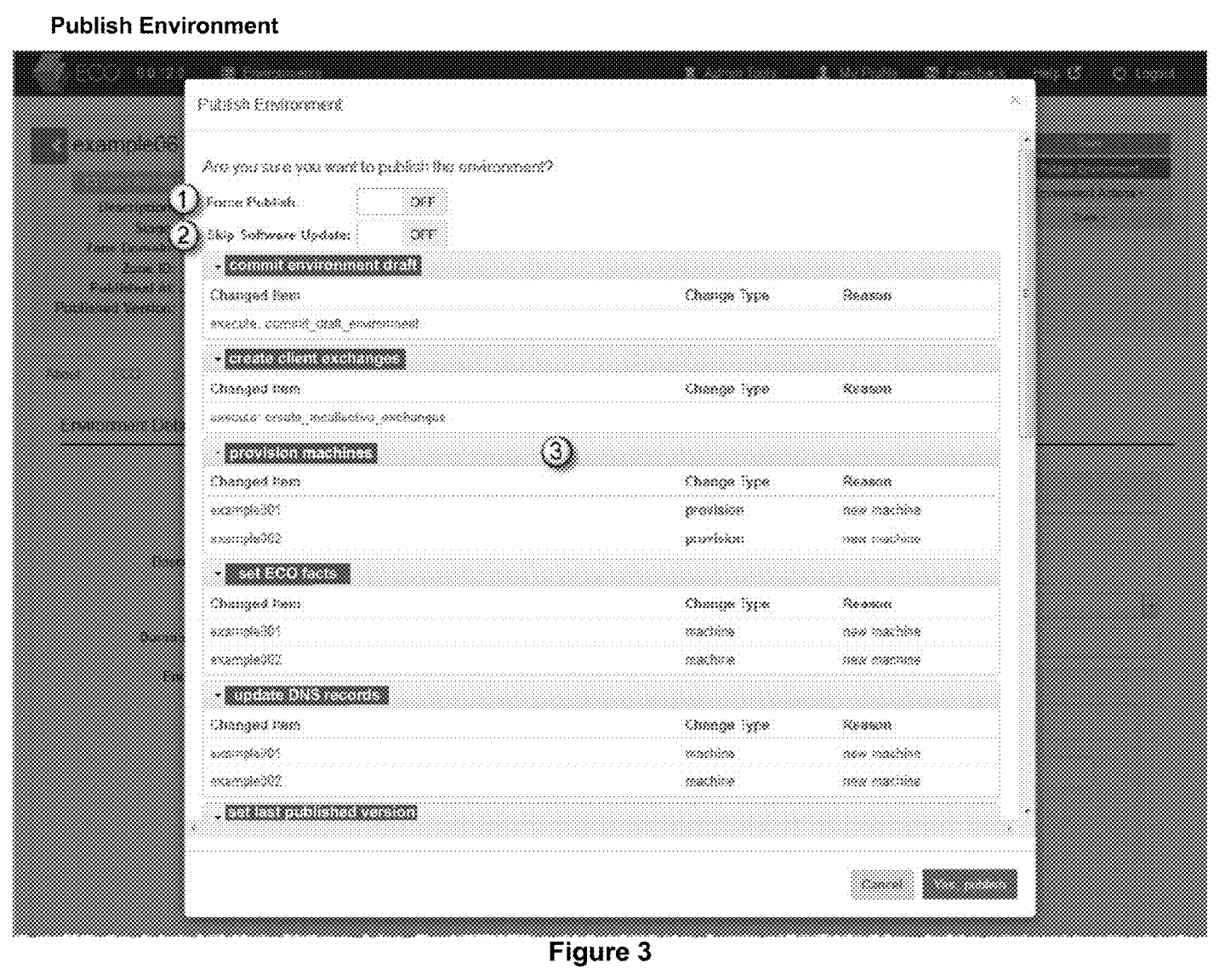
Figure 3A:
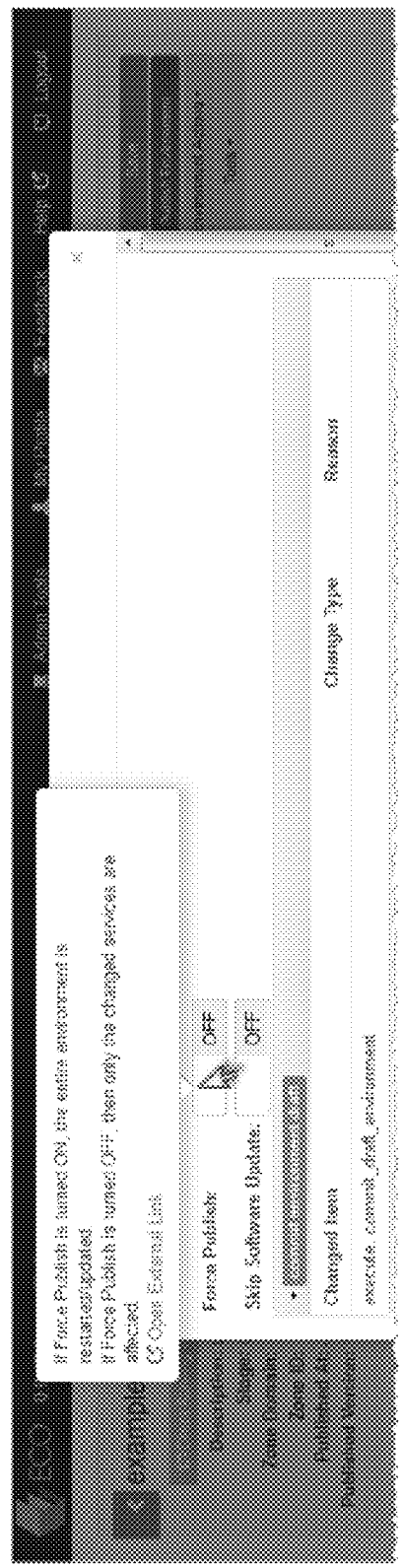
FIG. 3A illustrates an exemplary preview window screen rendition for publishing an environment, in accordance to an embodiment of the invention.

FIG. 3 illustrates an exemplary screen shot of a publish environment, in one embodiment. The publish environment workflow provides few options for selection. For example, when a "Force Publish" option, illustrated by bubble 1, is turned on, the entire environment is restarted/updated. When the "Force Publish" is turned off, only the changed services are restarted/updated. FIG. 3A illustrates the distinction between the Force Publish off and on options when an input action, such as a hovering of a cursor over the field, is detected at the Force Publish option. The ECO mechanism has the built-in intelligence to identify environment services that have changed and update the machines that have or use those services.

Continuing to refer to FIG. 3, a "Skip Software Update" option, illustrated by bubble 2 may be turned on or off to control whether to run full application software update. A "Review changes" option may be used to view the separate activities that will be run when the workflow is triggered. The activities are sent to the ECO workflow service via a workflow preprocessor and are also presented in collapsible sections, as illustrated by bubble 3. The preprocessor uses logic specified in the environment descriptor to perform the various activities in an order defined by the environment descriptor.

Figure 4:
FIG. 4 illustrates an exemplary view of a log specifying exemplary workflow steps (identifying workflow actions/activities) that were executed from a specific workflow within an Environment history page, in one embodiment of the invention.

FIG. 4 illustrates a sample screen capture of Environment history window that is used to inform a user of the various activities performed, in one embodiment of the invention. The activities listed under "Run History" section in the Environment History are the same set of activities that are listed in the collapsible sections in the preview window illustrated in FIG. 4.

Figure 5:
FIG. 5 illustrates an exemplary environment action (workflow execution) preview window, in accordance to one embodiment of the invention.

FIG. 5 illustrates an exemplary screen capture of ECO "workflow" actions that are scheduled to be taken, in one embodiment. In one embodiment, all the ECO workflow actions are rendered as collapsible options in a preview window. In one embodiment, the preview window may render a progress bar or use any other status indicator mechanism to identify status of the actions that are currently being taken or actions already taken. As indicated with reference to FIG. 3, the collapsible sections represent activities that will be run during the execution of the workflow and the order of the activities in the window, in one embodiment, may represent the order in which the activities are run. The activities that are listed are similar to the ones shown in the "Environment history" window of FIG. 3 and the "Run History" section of FIG. 4.

Figure 6:
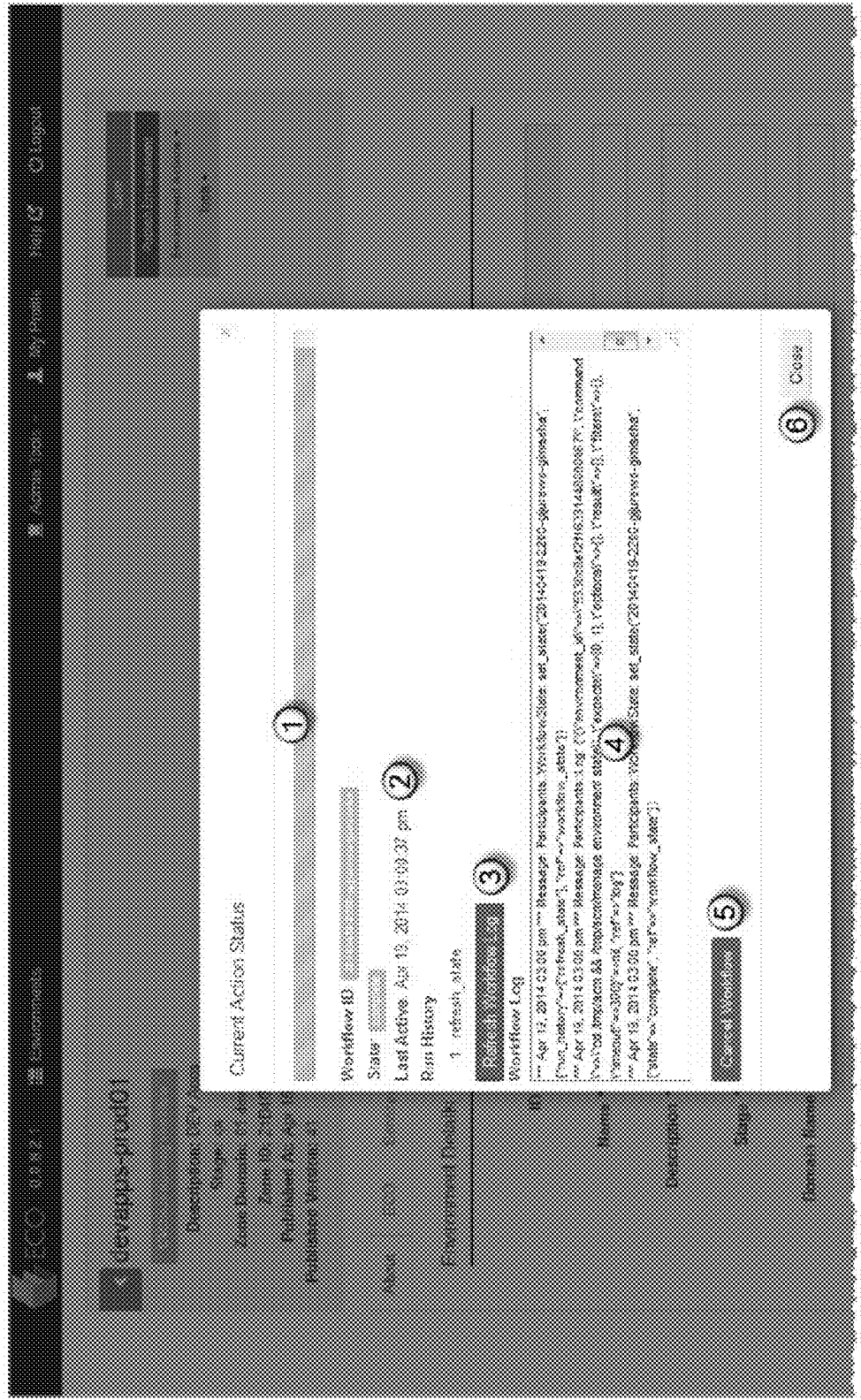
FIG. 6 illustrates an exemplary environment action (workflow execution) status window, in accordance to an embodiment of the invention.

FIG. 6 illustrates an exemplary screen capture of a "Current Action Status" window for actions initiated by the workflow, in one embodiment. The current action status window opens when a workflow action is initiated. After the workflow action is completed, a message or an indicator may be displayed at the top or bottom of the page rendered in the window. The current action status window provides a progress indicator, illustrated by bubble 1, to provide a current status of the workflow action. Workflow details are provided in the section represented by bubble 2, wherein the workflow action identifier, state of the workflow action, time stamp of the last transaction message logged and run history details are provided. An option to refresh a log of the workflow action is provided, as illustrated by bubble 3. When the refresh option is selected, a log detailing the workflow action is presented in a sub-window illustrated by bubble 4. The workflow action can be canceled at any time using the "Cancel Workflow" option, as illustrated by bubble 5. A "Close" option may be used to close the window, as illustrated by bubble 6. In one embodiment, the close option may just close the window and not cancel the workflow operation. In an alternate embodiment, the close option may cancel the workflow operation and close the window.

Figure 7:
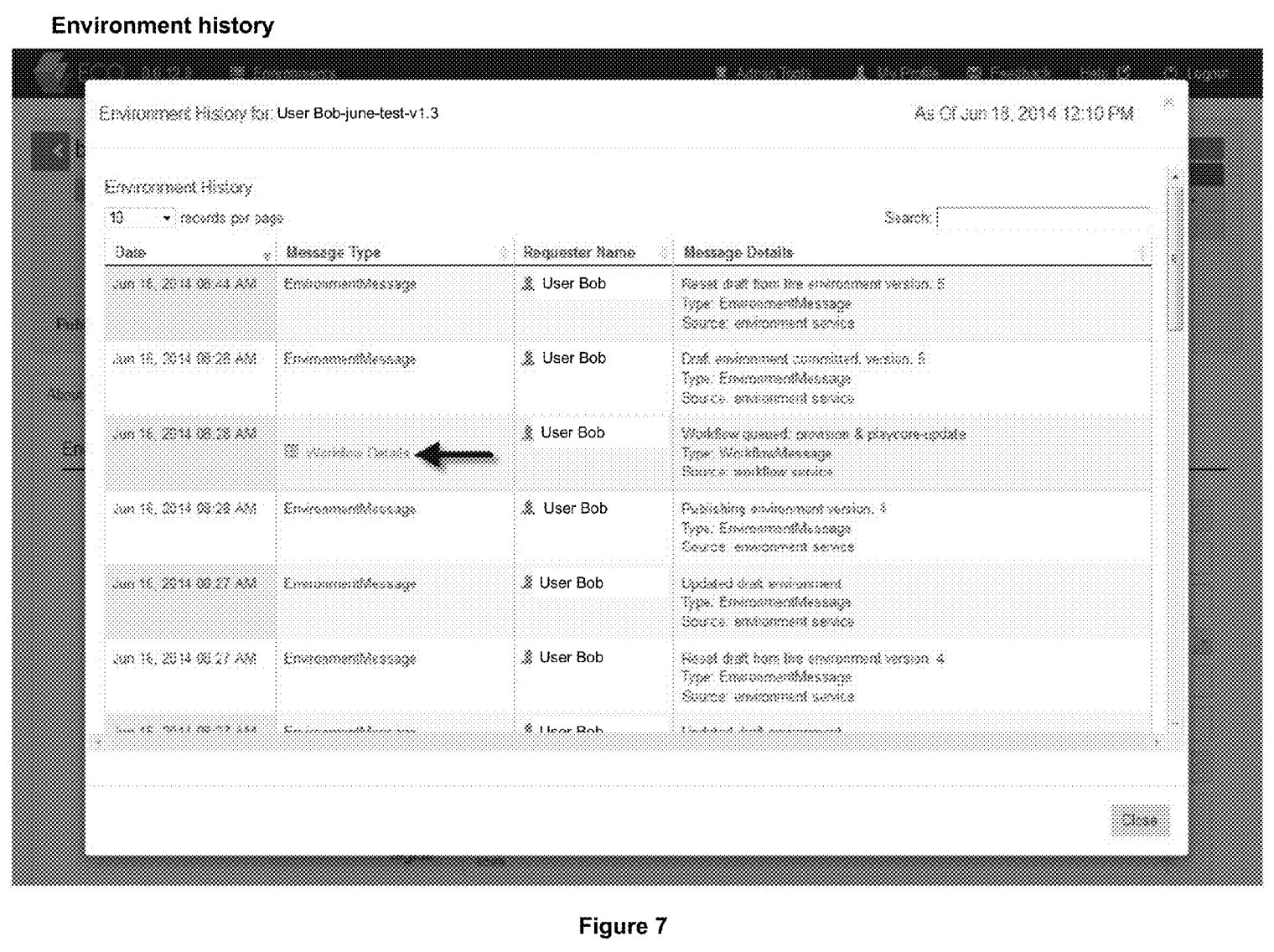

The ECO mechanism provides details of all logged transactions for the environment. An Environment History database may store the history of the different transactions for the environment and populate an "Environment History" window, as illustrated in FIG. 7. The environment history window of FIG. 7 provides different information than the environment history window of FIG. 4. For example, the environment history window of FIG. 4 presents the run history details within the workflow detail section for each workflow that was triggered. Whereas, the logs presented in the environment history window of FIG. 7 represent ECO service messages for actions, workflows, and events taken to provision the environment. The transaction list records the details of the environment activity including transaction time stamp (i.e., date), user name who initiated an action (Requester Name), ECO transaction messages, parameters used when executing the action, etc. One or more links may be provided at each of the activity log to allow one to view inline transaction details for that activity, as illustrated by the arrow in FIG. 7. When the link is selected, the inline transaction details similar to what was shown in FIG. 4 will be presented in a separate window or in place of the existing window.

Figure 8:
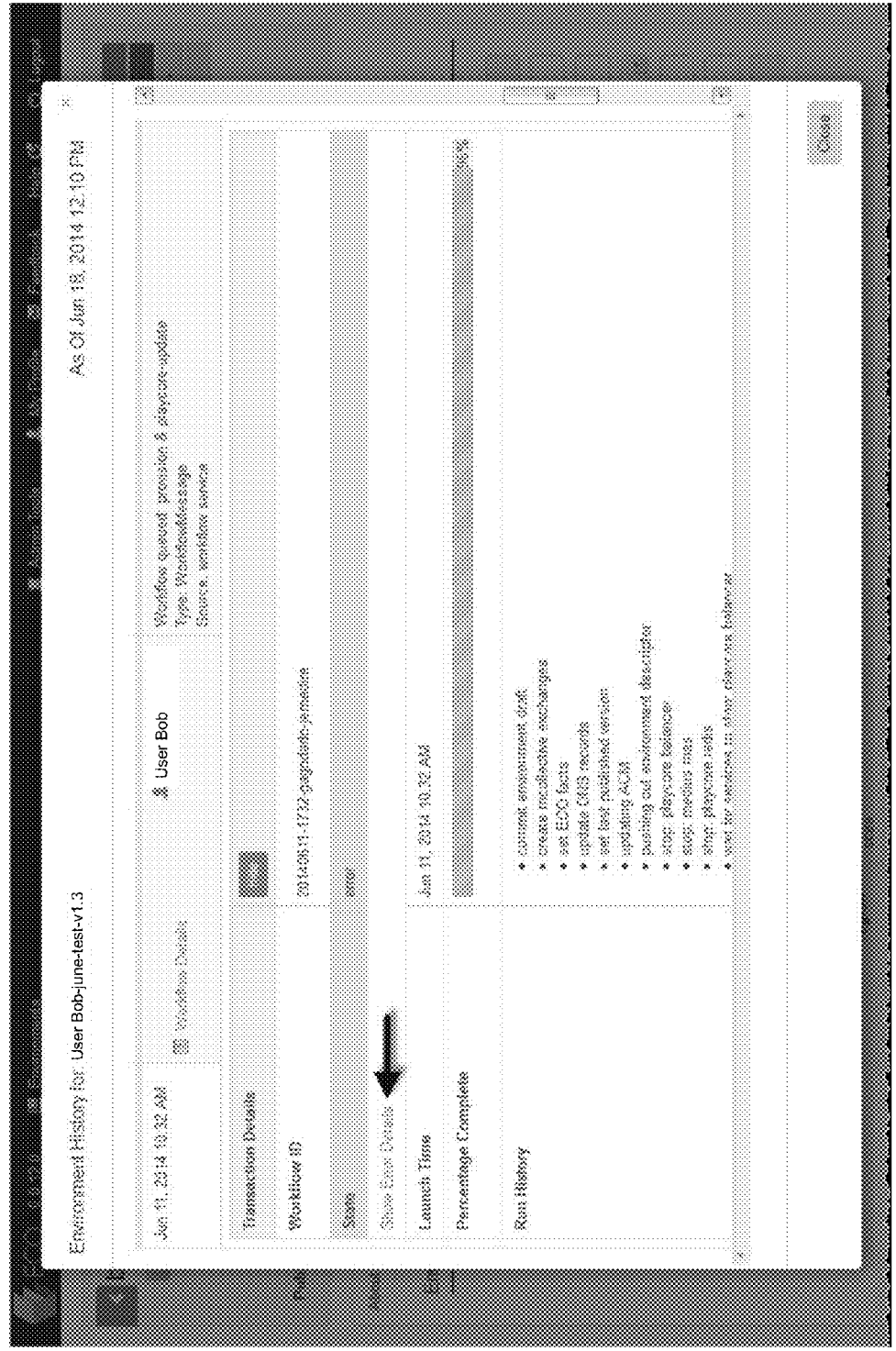
FIG. 8 illustrates an exemplary screen rendering a workflow error within the environment history overview, in accordance to an embodiment of the invention.

For events that did not complete due to an error, an optional link may be provided to view the details of the error. FIG. 8 illustrates an exemplary screen capturing a view of Environment History, when an error is encountered in one of the workflow activities. The optional link may be selected to view a trace log of the error. Optionally, the link may be selected to inform a user initiating a request of the error encountered. In one embodiment, the user may be informed of the error through email and the email may include an error log. In an alternate embodiment, an informational message may be generated and presented to the user in the format and message tool desired by the user.

Figure 9:
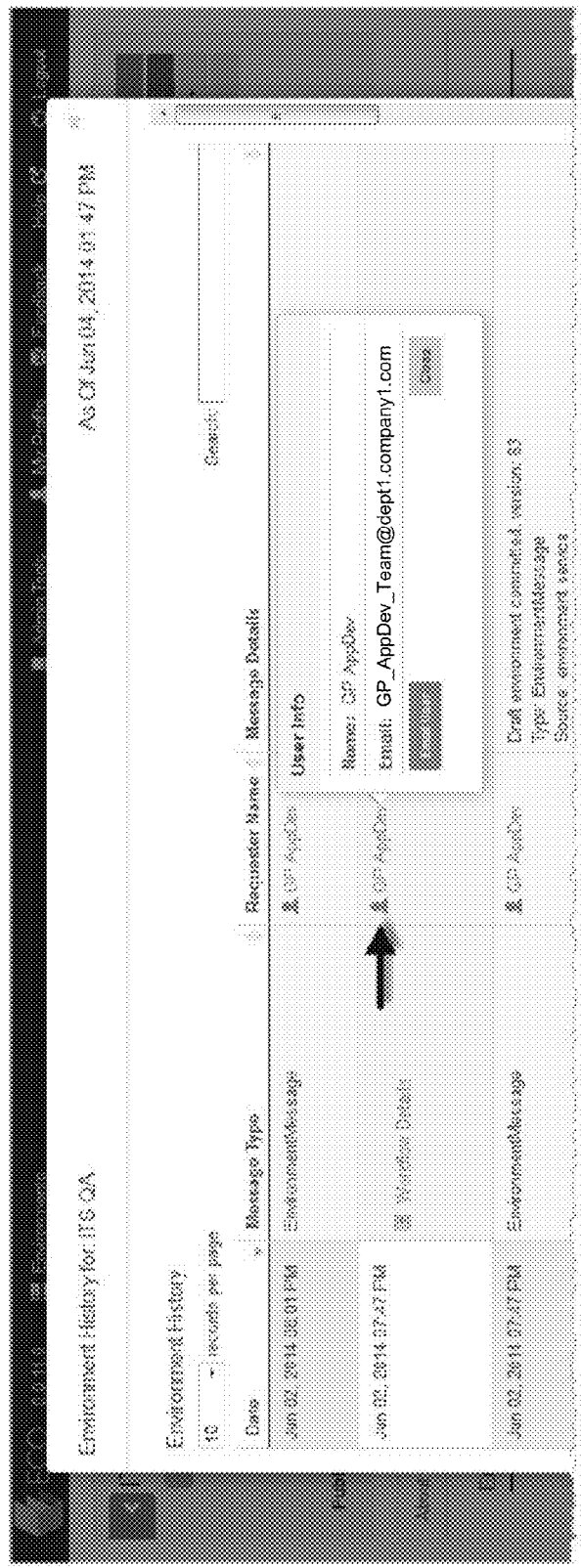
FIG. 9 illustrates an exemplary screen rendering requester details in environment history, in accordance to an embodiment of the invention.

In one embodiment, the error log may be presented in a window to a user with necessary links to access the details provided in the error log. FIG. 9 illustrates an exemplary window for providing a user with an option to access the error log. In this embodiment, the error log is provided in a link within an email to the user. In one embodiment, when the link is accessed, the error log identifies a plurality of entries detailing the different errors encountered during the execution of the workflow activities and the entries may be organized based on severity of the errors. In an alternate embodiment, the entries may be arranged in temporal order. The links provide further details of the user and the mode used to inform the user of the errors encountered.

A specific environment may be searched and identified based on one or more attributes. Search options may be provided to enable users to enter values for the attributes and a search tool may use the attributes and its values to search the environment descriptor file to identify and return details of the matching environment.

In one embodiment, entities may be managed and cloud entities assigned by one or more users based on the roles they have been assigned in each environment. Management of entities may include adding user roles to control access to resources in the ECO system, adding organizations so that applications and environments can be created within the organization, adding tenants so that they can be associated with an organization, adding cloud providers so that they can be associated with a tenant within an organization and adding security keys so that they can be associated with a tenant within an organization. Once a user is added, the user is assigned to an organization so that the user has access to resources within that organization. A role is assigned to the user so that the user has defined role and appropriate permissions with controlled access to resources in ECO system. Access to application is assigned to a user based on the user's assigned role so that the user can access application within their organization. In this embodiment, cloud providers (or any resource/service providers) may be configured as System providers providing services, such as computing services, storage services, database services, etc. These services are then "registered" in a System Catalog of Services and organized by location. The system catalog of services may be maintained in a centralized cloud data center as well as in cloud data centers at different geo-locations or geo-regions, which may include more than one geo-location. Organizations are associated with specific System providers through an association with the organization's accounts maintained with each system provider. The environments for applications within an Organization will have access to the services/resources provided by the system provider at the desired geo location. As such, resources (storage, database schema, fixed IP, etc.,) will be consumed by environments in accordance to the specifications or provisions defined in an environment to be used by other environments.

Figure 10:
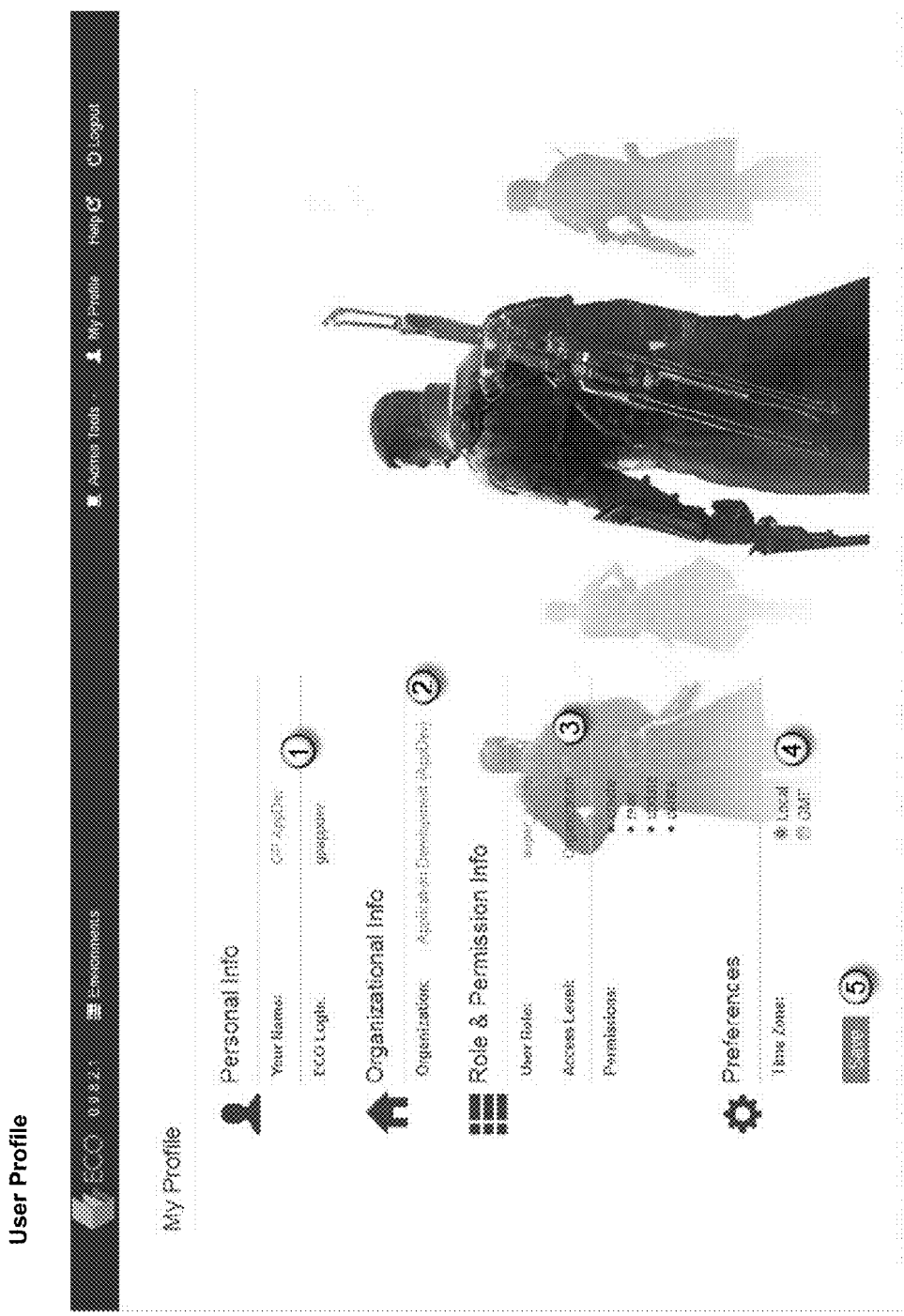
FIG. 10 illustrates an exemplary screen of a user profile used for executing an application, in accordance to an embodiment of the invention.

FIG. 10 illustrates an exemplary screen representing a user's profile. The user profile may include a user's personal information (illustrated by bubble 1), such as User's Name, login identifier, etc., organizational information (illustrated by bubble 2), such as the user's assigned organization, etc., user's role and permission information (illustrated by bubble 3), such as the user's assigned role, access level, permission list, etc., user's time zone preferences (illustrated by bubble 3). The identity management service (2.8 in FIG. 2) may be used to define the user profile and the user profile information may be saved to a database and referenced by the identity management service as and when required by the environment and/or the application.

Figure 11:
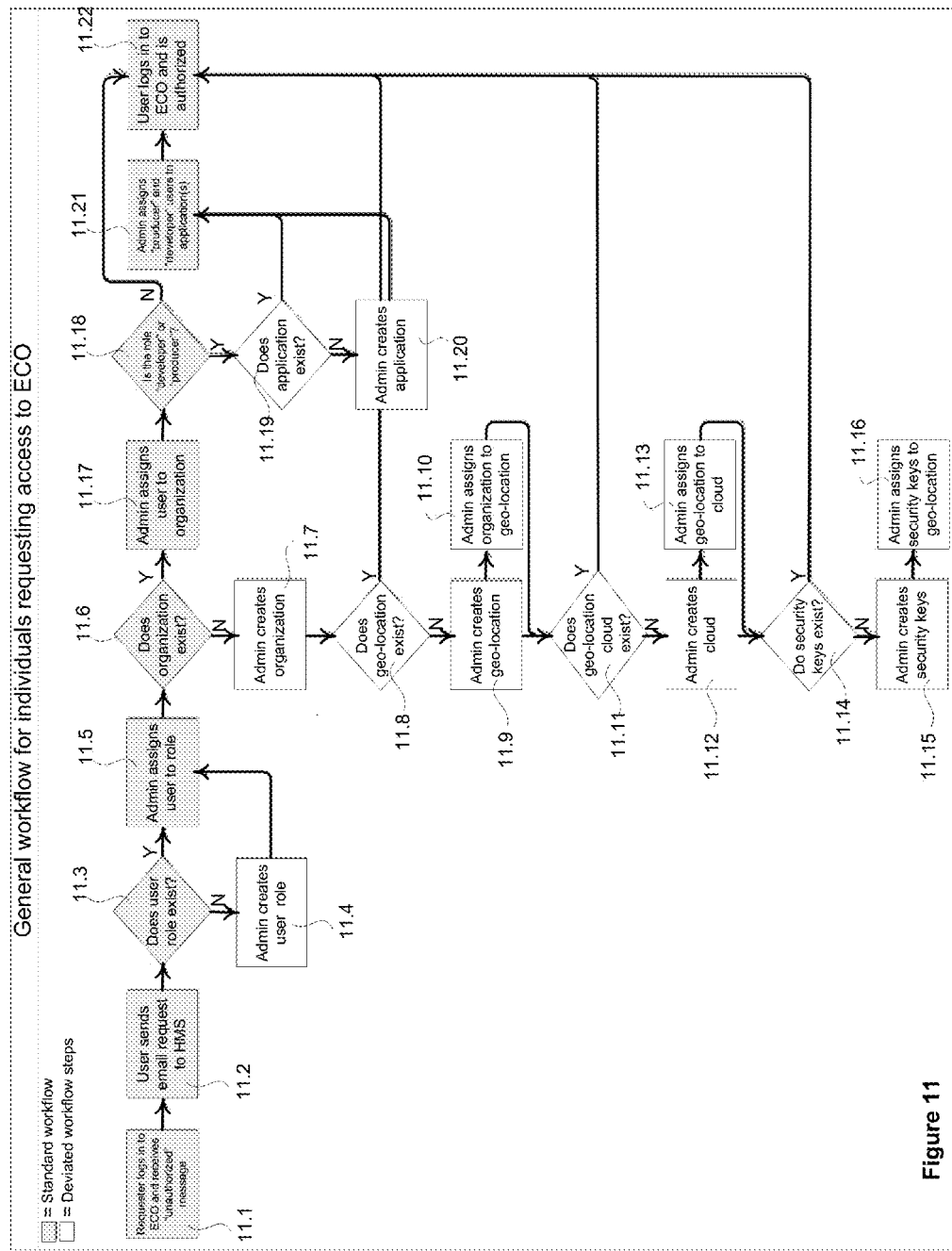
FIG. 11 illustrates a general workflow for an individual requesting access to a deployment mechanism, in accordance to an embodiment of the invention.

FIG. 11 illustrates a general workflow for individuals requesting access to ECO system, in one embodiment. When an individual wants to start using the ECO GUI, the individual is first requested to log into the ECO system using an externally managed Lightweight Directory Access Protocol (LDAP). The credentials allow the requester's name to be recorded in the ECO system. An "unauthorized" message with instructions to send a request to Hosting Management Services (HMS) is sent to the requester, as illustrated in operation 11.1. The request, in the form of an email, from the requester to the HMS specifying the organization to which the requester belongs and request for access, is received at the HMS, as illustrated in operation 11.2. An administrator (also referenced as "admin user") of the HMS will then assign the requester (i.e., new user) to a user role. In order to do that, the administrator first checks to see if the user role exists, as illustrated in decision box 11.3. If the role does not exist, as illustrated by the "No" branch in decision box 11.3, the administrator creates the user role in the ECO system, as illustrated in operation 11.4. Usually a set of default user roles are already defined with necessary permissions and made available to the ECO system. Upon creating the user role or upon identifying the appropriate user role from existing default user roles, the admin user will assign the requester to the newly created or identified user role, as illustrated in operation 11.5.

The admin user will then assign the requester to an organization. The admin user will first determine if an organization exists, as illustrated in decision box 11.6. If no organization exists in the ECO system, the admin user adds the organization to the ECO system, as illustrated in operation 11.7. For an existing organization, one or more associated geo-locations should already exist and that each geo-location should already have an associated cloud and security keys assigned to it. The admin user verifies to see if a particular geo-location exists for the organization, as illustrated in decision box 11.8 and if not, the admin user creates the geo-location, as illustrated in operation 11.9 and assigns the organization to the geo-location, as illustrated in operation 11.10.

Once the tenant is created, the admin user determines if a cloud exists for the geo-location, as illustrated in decision box 11.11. If the cloud does not exist, as illustrated by the "No" branch of decision box 11.11, the admin creates a cloud, as illustrated in operation 11.12. The Admin assigns the newly created geo-location to the new cloud, as illustrated in operation 11.13. The admin user then determines if security keys exist, as illustrated in decision box 11.14. If the security keys do not exist, as illustrated by the "No" branch of decision box 11.14, the admin user creates the security keys, as illustrated in operation 11.15 and assigns the newly created security keys to the geo-location, as illustrated in operation 11.16.

On the other hand, if an organization exists, as illustrated by "Yes" branch in decision box 11.6, the admin user assigns the requester to the organization, as illustrated in operation 11.17. The admin user then determines if the requester's role is a "Developer" or a "Producer", as illustrated in decision box 11.18. If the requester's role is not a developer or a producer, as illustrated by the "No" branch in the decision box 11.18, the requester is allowed to log in to the ECO system and is authorized, as illustrated in operation 11.22. If the requester's role is developer or a producer, then the admin user will need to assign application access to the requester. In one embodiment, all existing application within the organization is assigned to the requester. In order to assign the application access, the admin user needs to determine if the application exists, as illustrated by decision box 11.19. If no application exists, as illustrated by the "No" branch in decision box 11.19, the admin user creates the application, as illustrated in operation 11.20. If, on the other hand, the application exists, as illustrated by the "Yes"

branch in decision box 11.19, the admin user assigns the requester with the "producer" and/or "developer" role to the application(s), as illustrated in operation 11.21 and the requester is allowed to log into the ECO system and is authorized to access the application, as illustrated in operation 11.22. In one embodiment, although the role of the admin user appears to be a manual process, the role may be automated. In this embodiment, sufficient security measures may be built-in to the automated process to ensure that proper user authentication is done prior to granting a role or permissions to a user.

Figure 12:
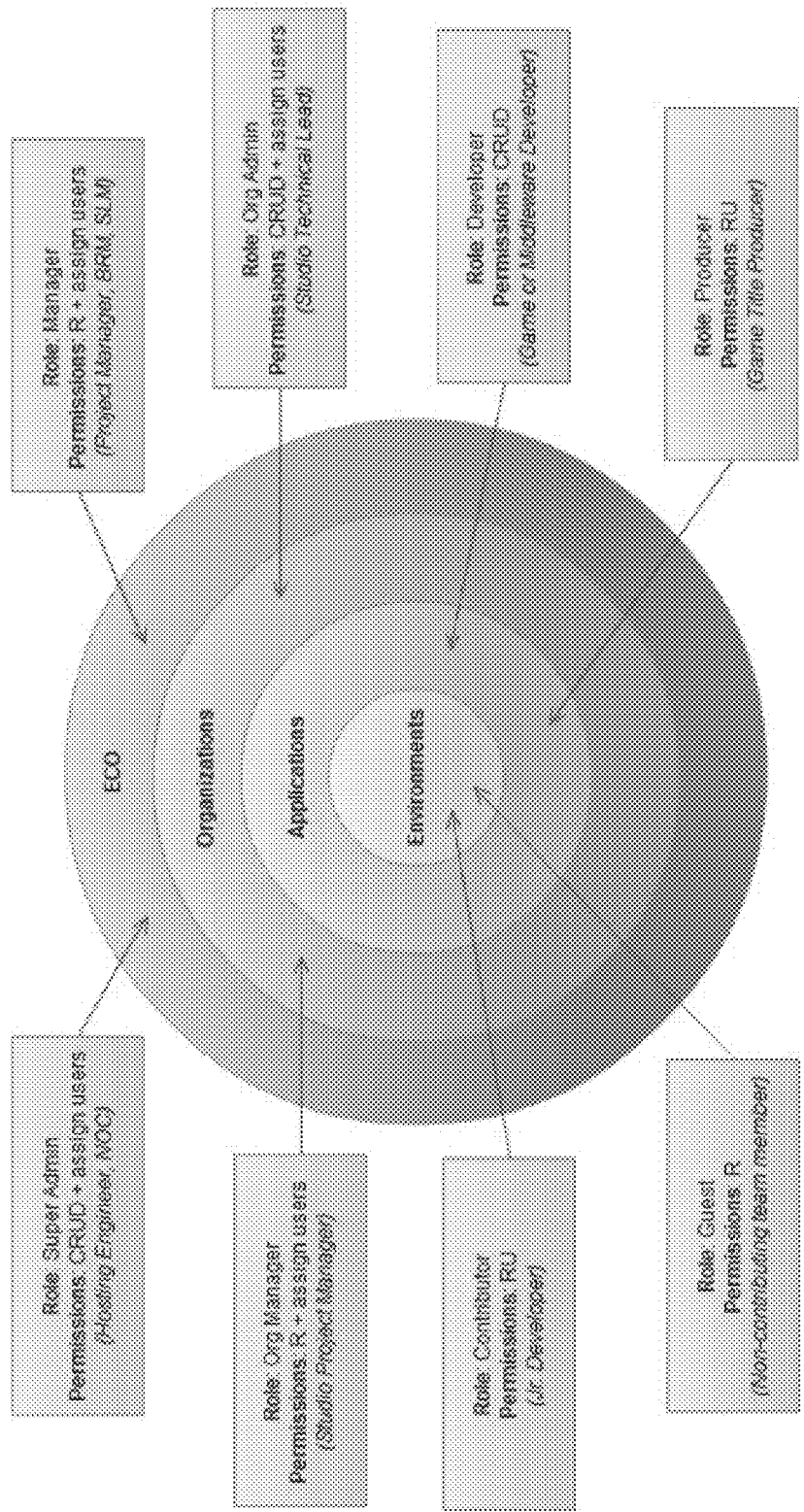
FIG. 12 illustrates hierarchical relationship between levels of access as provided in a deployment mechanism, in accordance to an embodiment of the invention.

The role that is assigned to a user determines the access rights for service operations and GUI features. The role determines what GUI elements are available to a user and which ones of the Create/Read/Update/Delete (CRUD) permissions are available to a user. The user role determines the hierarchical relationship between levels of access. FIG. 12 illustrates an exemplary hierarchical relationship between levels of access based on the role assigned to a user, in one embodiment. For example, users in ECO level, such as Super Admin users or Managers, are provided with system-wide access to all data, organizations, applications and environments. Users with Organizations level, such as Organization Managers and Organization Admins, are provided with access to their own organizations, applications and environments. Users with Applications level, such as Developers and Producers, are provided with access to applications and environments within their own organization's title/application. Users with Environments level, such as Guests and Contributors, are provided with access to environments within their own organization's application.

Figure 13:
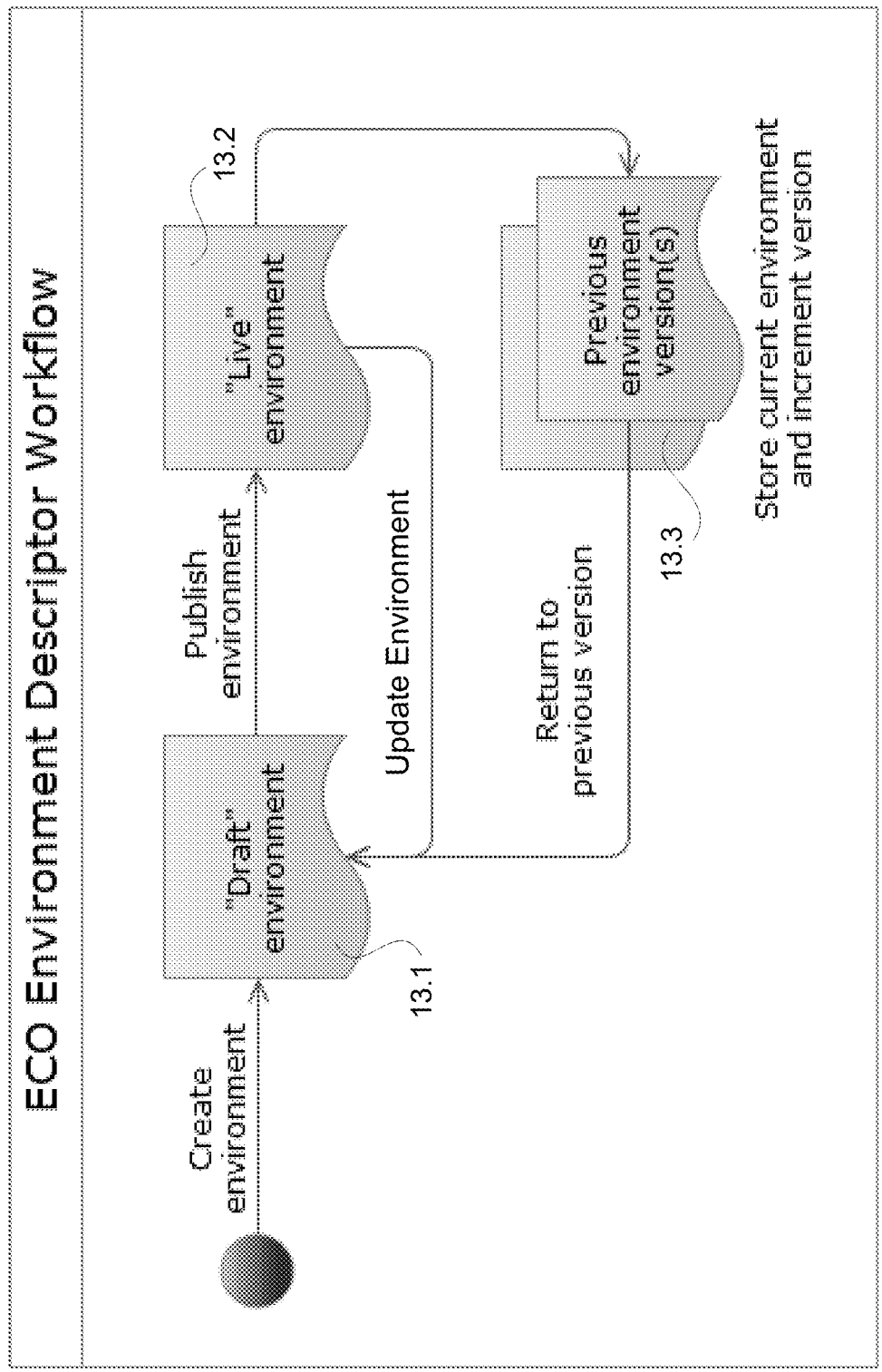
FIG. 13 illustrates a deployment system environment descriptor workflow, in accordance to an embodiment of the invention.

In one embodiment, a new environment can be created and managed by engaging an Environment Descriptor Workflow, as illustrated in FIG. 13. The Environment Descriptor Workflow identifies the resources/services that are needed within the environment and triggers additional workflows for provisioning such resources/services. In this embodiment, when a new environment is created, the environment is designated with a version number and when changes to this environment are made, a new version number is designated to the environment with the changes. The Environment Descriptor Workflow helps in the creation and management of multiple releases of environment configuration, with each subsequent release having the same general function as the previous release but is improved, upgraded or customized. The multiple versions prevent releases from being deleted or overwritten by mistake, and allows for archival of releases so they can be retrieved at any time.

FIG. 13 illustrates an embodiment wherein an Environment Descriptor Workflow is engaged to create a new environment. When a new environment is initially created using the Environment Descriptor Workflow, a "Draft" environment 13.1 version is generated. The draft environment is converted to a "Live" environment 13.2 when the environment is published. When changes are needed to be made to the environment due to upgrades or customization, the changes are usually made to the "draft" version and not to the "live" published environment version, as illustrated in FIG. 13. When the changes are published, a new version of the "Live" environment is generated. When the change is saved, the current "live" environment version with the changes is saved alongside the previous environment version(s) 13.3 and the version number is incremented. A new draft of the "Live" environment version is automatically created and any subsequent changes that are made to the environment are made to the draft version. In one embodiment, the version number of the environment applies only to the live version and is incremented after a successful "publish environment" action. Older versions of the environment are maintained and can be retrieved from the database (for example, in database 2.25) and the environment configuration from the older version used in defining the environment, if need be.

In one embodiment, when an environment changes, an environment descriptor workflow is triggered causing the environment descriptor record for the environment within the environment descriptor file to be updated to reflect the change. When the environment needs to be published (i.e., changes need to be deployed to the environment), the environment descriptor workflow initiates a "Publish Environment" workflow. The publish environment workflow runs a string of actions that includes updating the application, updating the necessary services/resources, and pushing the updated environment descriptor record out to all machines within the environment, even when one or more machines have no changes detected within the change. The publish environment workflow, in one embodiment, runs a number of actions including, 1. committing the environment draft version;
2. logging the current service state and deployed revision in the environment;
3. checking for machines to terminate and checking that all DNS records are valid;
4. provisioning new machines and verifying that any existing machines are running;
5. updating new DNS records on machines and checking/adding floating IP addresses;
6. updating ACM on machines;
7. updating application stack software; and
8. setting the last published environment version in the storage.

Figure 14:
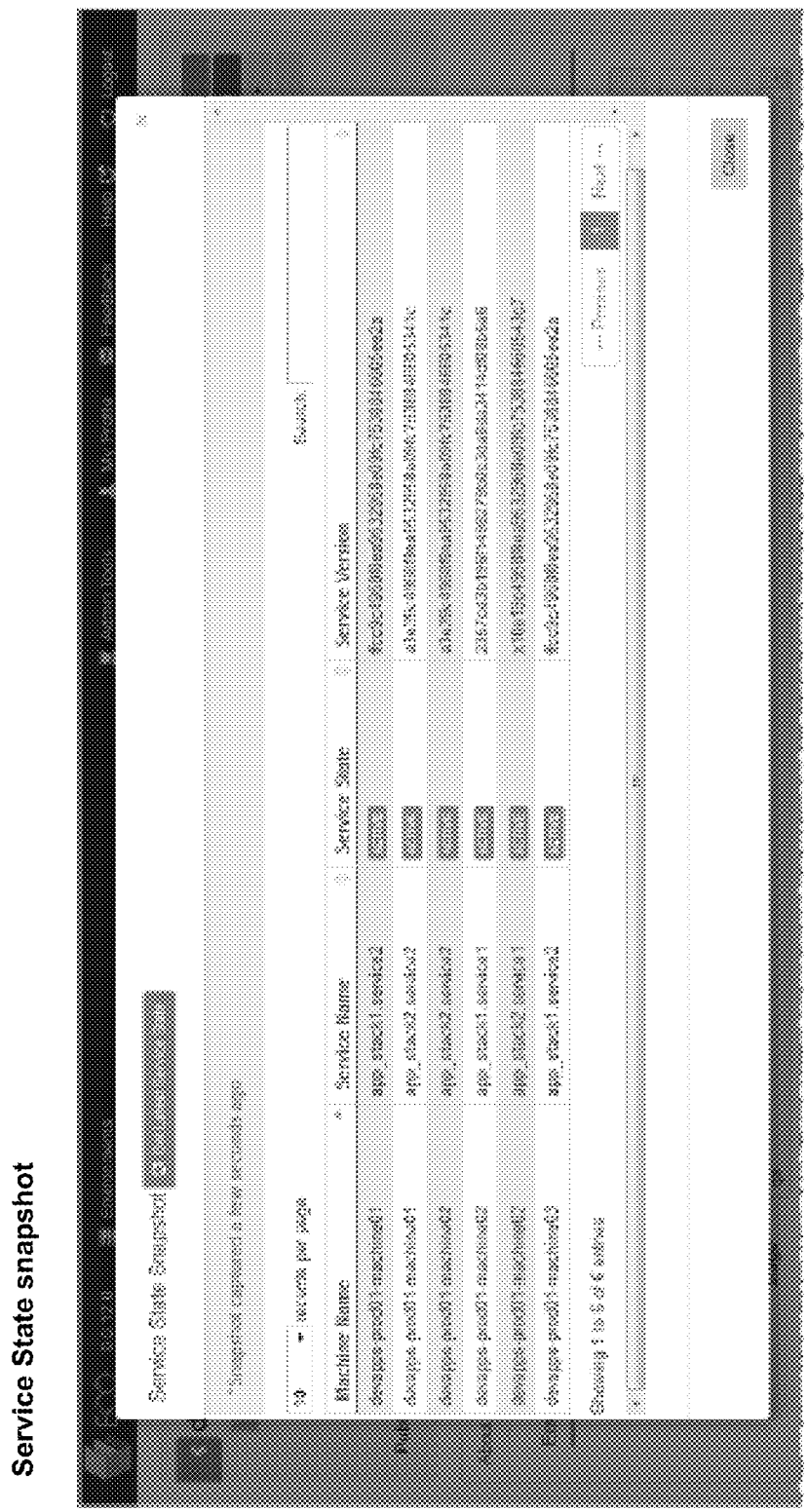
FIG. 14 illustrates an exemplary screen rendition capturing application service state, in accordance to an embodiment of the invention.

In one embodiment, the publish environment workflow provides options to check latest status of the various actions that are being executed via the workflow. FIG. 14 illustrates an exemplary screen view of a status preview window. The screen view illustrates a "snapshot" window that is provided by the deployment mechanism for checking status of the environment services including what services are running in the environment and revision information for each service. The window provides information regarding machine names, name of services running on each machine, service state of each service and version number of the service, to name a few. The list of fields provided in the window is exemplary and fewer or more fields may be included to provide latest status of the various actions.

Figure 15:
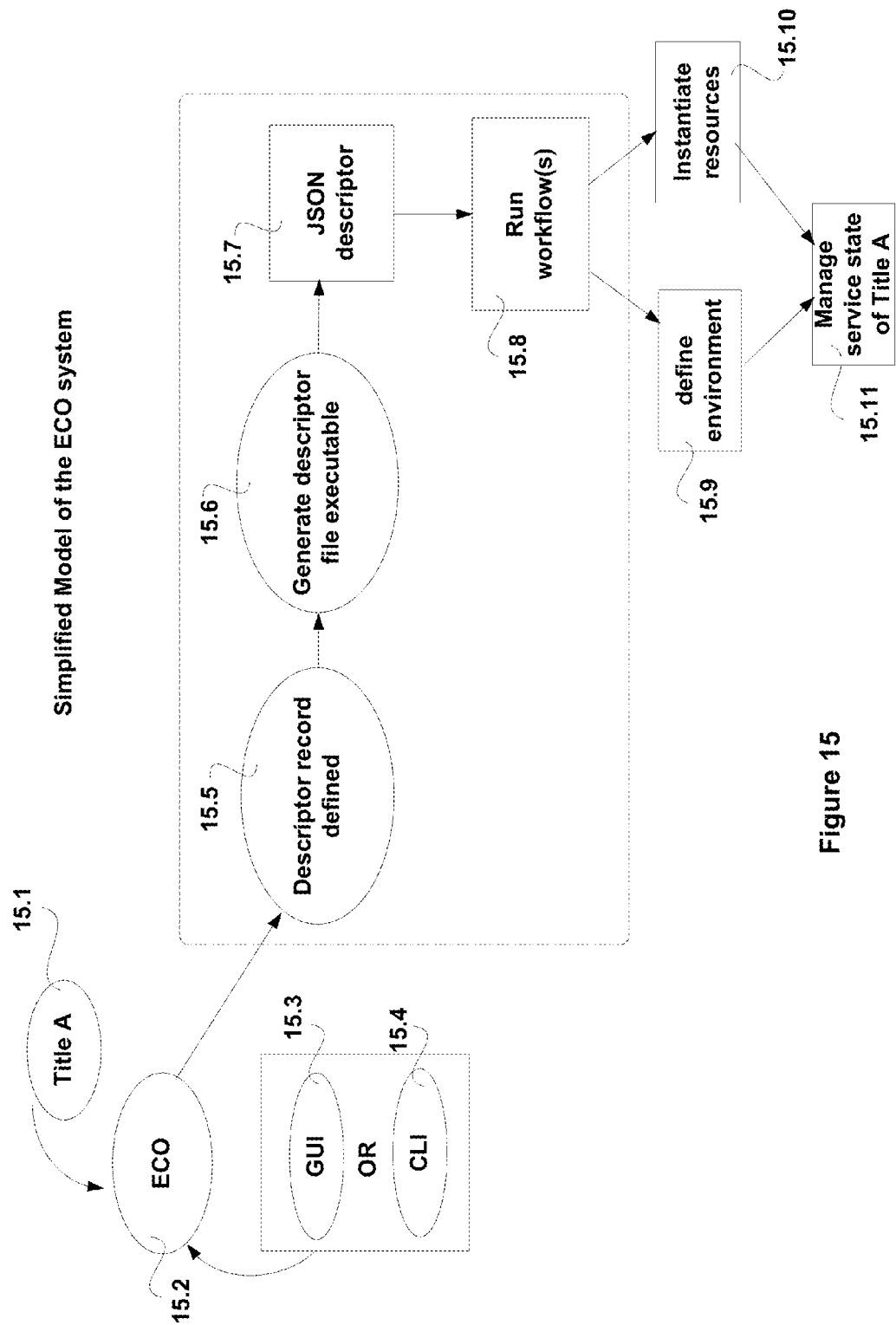
FIG. 15 illustrates an exemplary publication model of a deployment system, in accordance to an embodiment of the invention.

FIG. 15 illustrates a model that summarizes the process flow of a deployment mechanism used to provision resources/services for an application, in one embodiment. An application, Title A 15.1, is uploaded to the ECO system 15.2 for execution in an environment supported by the ECO system. A graphical user interface 15.3 or a command line interface 15.4 is used to provide an outline of an environment specifying all the services/resources that are going to be needed for the application 15.1 to successfully execute in the environment. The information entered through the GUI 15.3 or the CLI 15.4 is used to define an environment descriptor record 15.5. Information from the descriptor record is processed to generate a descriptor executable file 15.6. The descriptor executable file creates a JSON descriptor record within a JSON descriptor file 15.7, if a record does not exist for the particular environment where the application is to execute. Alternately, if a record exists for the particular environment, the descriptor executable file updates the existing JSON descriptor record with information received from the GUI or the CLI. The JSON descriptor defines a hierarchical list of services/resources needed for consumption in order for the environment to exist for executing the application.

When the application is selected for execution, the JSON descriptor file 15.7 is read to identify the resources/services required for successful execution of the application, and appropriate workflows are run to create the environment and provision the required services/resources 15.8. The workflows cause the environment to be defined 15.9 and resources/services to be instantiated within the environment 15.10. Once the environment is defined and the services/resources provisioned, the application is executed in the environment and the state of the application, resources/services and the user are managed 15.11.

Managing the application, resources/services may include monitoring the services/resources as well as the environment in which the application executes to determine if the environment has been configured for optimal performance of the application. Consequently, the service logs, action logs, user logs, session logs, system logs, etc., are analyzed to determine if additional instances of the application need to be instantiated, if the resources/services that are provisioned are sufficient and optimal for the execution of the application to meet the demand, cost, performance, etc. In one embodiment, the deployment mechanism may refer to a set of pre-defined rules to determine if the application is executing optimally. In one embodiment, based on the analysis, it may be determined that one or more resources or services may need to be migrated from one server to another server within the same cloud service or on a different cloud service, one or more resources or services upgraded, deleted, added or changed, or the environment needs to be migrated from one cloud service to another cloud service. When it is determined that changes need to be done, various states related to the execution of the application within the environment are saved; changes to the environment are performed; appropriate environment descriptor record updated; the changes are published; and the application restarted using the information in the environment descriptor record either in a new environment or in an existing environment with the changes, using the various saved states of the environment. The various states may include user state, service state, application state, etc.

As can be seen from the various embodiments, the deployment mechanism provides a multi-cloud orchestration platform for deploying an application into a cloud. The environment descriptor file outlining all the requirements for the application to execute in an environment are maintained centrally and distributed to different machines within the environment. When an application is executed, the environment descriptor file is read, decisions on which actions need to be taken are made, the actions are performed, statuses of the actions are logged and the status of the actions taken/not taken are reported back to a user. A single built-in API is configured to allow communication between the ECO system and the various services/resources, machines and various cloud system services using multiple formats.

Figure 16:
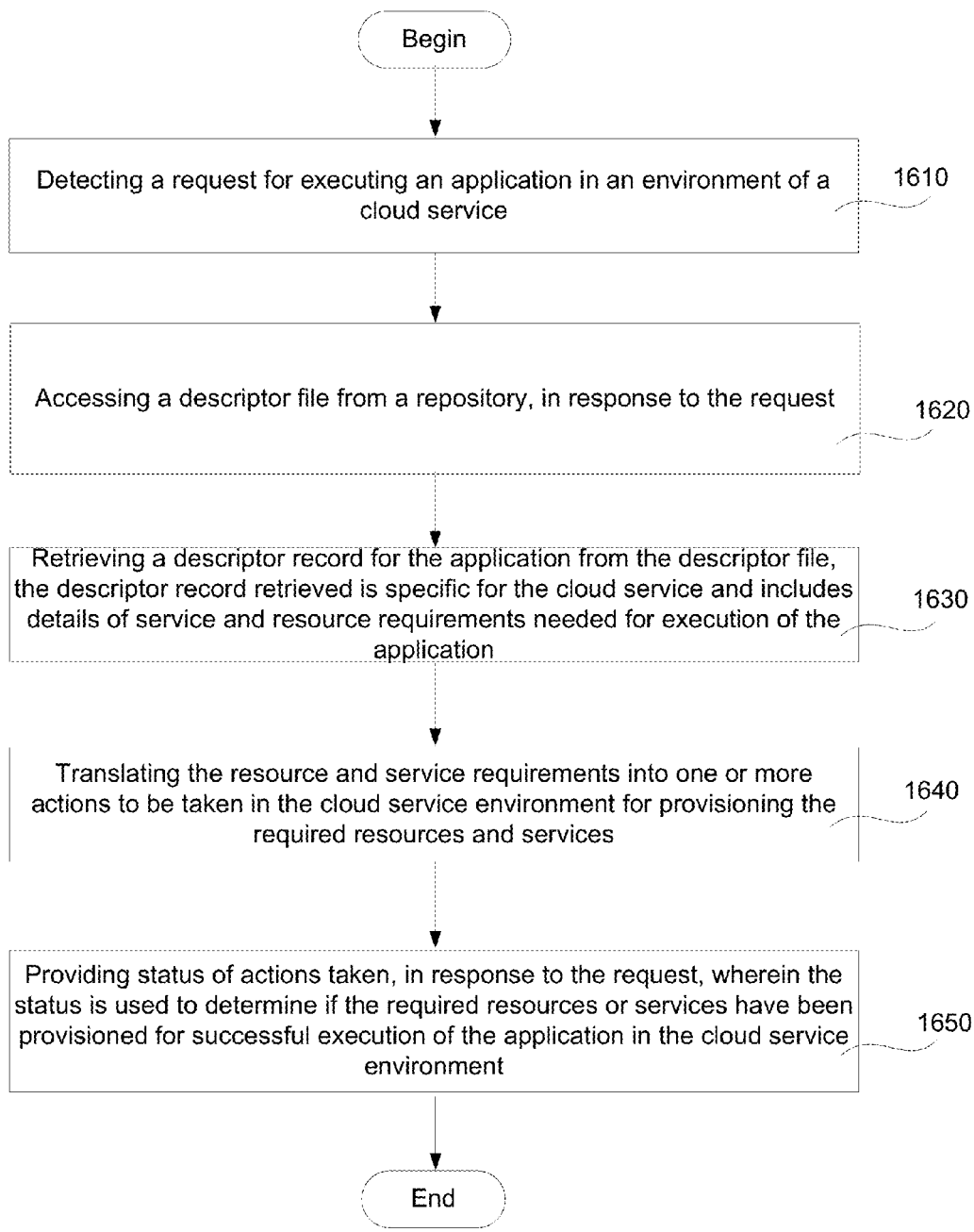
FIG. 16 illustrates a process flow diagram showing a method followed by a deployment mechanism, in accordance to an embodiment of the invention.

With the detailed description of the various embodiments, a method will now be described with reference to FIG. 16. FIG. 16 illustrates the method operations used for provisioning services/resources within a cloud system for successful execution of an application, in one embodiment. The method begins at operation 1610, wherein a request for executing an application on a cloud service is detected. The application may be any type of application including business applications, social media applications, gaming applications, etc., that are designed to execute on different hardware/software platforms. In response to the request, a descriptor file is accessed, as illustrated in operation 1620. The descriptor file is a repository and includes a plurality of descriptor records for each application that is to be executed on one or more cloud services. A descriptor record for the application is retrieved from the descriptor file, as illustrated in operation 1630. The descriptor record retrieved is specific for the cloud service and provides detailed specification of the environmental resources and/or services that are required for successful execution of the application in the cloud service environment.

The resource and service requirements provided in the descriptor record are translated into one or more actions that need to be taken in the cloud service environment for provisioning the required resources or services, as illustrated in operation 1640. The resources or services may include technical resources, such as storage resources, memory, network resources, processing resources, etc., and/or services to satisfy any dependencies specified in the application. Some exemplary actions associated with a service that may be performed include actions related to downloading software, configuring the software, starting up the software, deploying the service, etc. Some exemplary actions associated with an environment that may be performed include actions related to replicating an environment, provisioning servers, starting/stopping services, deploying services, etc. Status of actions taken (and not taken) is provided, in response to the request, as illustrated in operation 1650. The status of actions may be provided by updating the status of the various action fields/sub-records in the environment descriptor record so as to provide a current status of the environment configuration data (i.e., status, software and version, IP addresses, etc.). The status is used to determine if the required resources and services for the application have been provisioned for successful execution of the application in the cloud service. It should be noted that the environment configuration defined in the descriptor record may result in a hybrid hosting solution with resources being leveraged from more than one cloud service. The deployment mechanism allows the application to control its own environment configuration, including hybrid hosting solutions, and define its own set of workflows, making this a truly multi-cloud hosting management solution.

Figure 17:
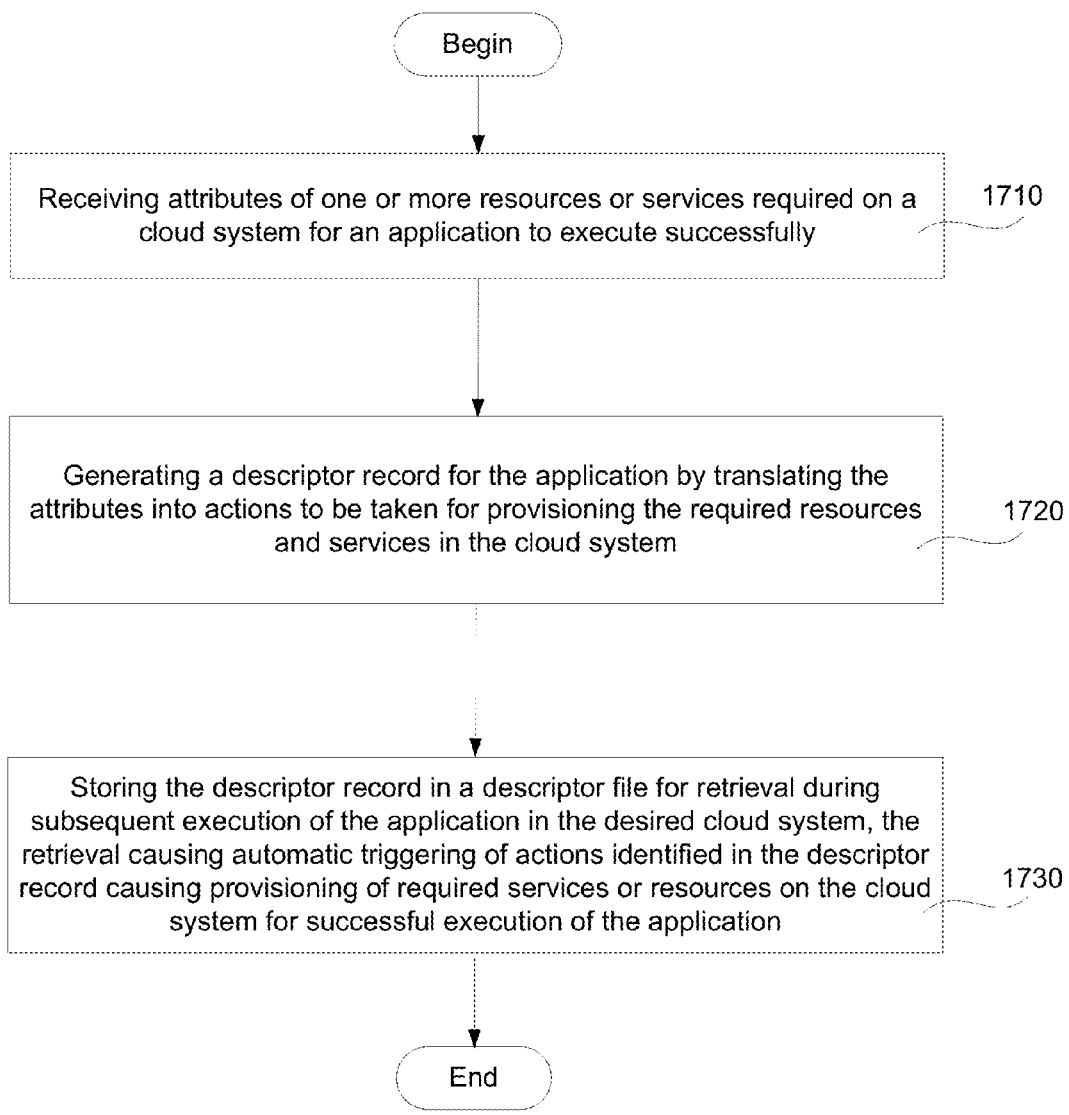
FIG. 17 illustrates a process flow diagram showing a method followed by a deployment mechanism, in accordance to an alternate embodiment of the invention.

FIG. 17 illustrates an alternate embodiment of a method used for provisioning resources/services for successful execution of an application in a cloud service. The method begins at operation 1710, wherein attributes of one or more resources or services required on a cloud system in order for an application to execute successfully, are received. The attributes may identify type of resource or service required, amount/level/version of resource or service required, etc. A descriptor record is generated for the application, using the attributes of the resources or services received, as illustrated in operation 1720. The descriptor record defines an environment profile that is specific for the cloud system and is generated by translating the resource and service requirements into one or more actions to be taken for provisioning the required resources and services in the cloud system. The generated descriptor record is stored in a descriptor file that is maintained in a deployment system database. The descriptor record is retrieved from the descriptor file when subsequent execution request for the application is received. The retrieval causes automatic triggering of the identified actions, as illustrated in operation 1730. The triggering of actions may result in the instantiating of one or more workflows causing the provisioning of the services or resources for the cloud system to enable the application to execute in the cloud system.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method, comprising:
   receiving attributes of one or more resources and services required on a cloud system for executing an application;
   generating a descriptor record for the application using the received attributes, the descriptor record defining an environment profile that is specific for the cloud system, wherein the descriptor record is generated by translating the one or more resources and services required into one or more actions to be taken for provisioning the required resources and services in the cloud system for successful execution of the application, wherein the generated descriptor record identifies a predefined sequence for the one or more actions to be taken based on the received attributes; and
   storing the descriptor record in a descriptor file maintained in a deployment system database;
   detecting a request for the execution of the application, the detection of the request resulting in a retrieval of the descriptor record for the application from the descriptor file, the retrieval causing automatic triggering of the predefined sequence for the one or more actions identified in the descriptor record resulting in the provisioning of the required services and resources on the cloud system to enable successful execution of the application,
   wherein method operations are performed by a processor.

2. The method of claim 1, wherein the attributes are received through an application programming interface (API) using one of a command line interface and a graphical user interface.

3. The method of claim 1, wherein the attributes of the resources and services are received based on examination of code of the application.

4. The method of claim 1, wherein the actions to be taken includes one or more of actions to be taken before execution of the application, actions to be taken during execution of the application and actions to be taken after execution of the application.

5. The method of claim 1, wherein the actions to be taken further includes,
   identifying and instantiating a workflow for each of the actions identified in the descriptor record.

6. The method of claim 5, wherein the workflow for one or more of the actions are identified on different cloud services in accordance to specifics provided in the one or more actions, each of the different cloud services identifying a service or a resource that satisfies service or resource requirement specified in the descriptor record for the application.

7. The method of claim 1, wherein automatic triggering of the predefined sequence for the actions further includes,
   monitoring performance of the application executing in the cloud system;
   dynamically adjusting the one or more resources and services to enable optimal performance of the application; and
   automatically updating the descriptor record for the application in accordance to the adjustment performed to the one or more resources and services, the descriptor record defining a current environment profile of the cloud system.

8. The method of claim 7, wherein dynamically adjusting further includes migrating the application to a new cloud system, the new cloud system having the required resources and services for optimal performance of the application,
   wherein the new cloud system is identified based on type of performance desired for the application.

9. The method of claim 8, wherein migrating the application further includes,
   storing an user state, an application state, a restart point, and other data related to the application;
   provisioning the resources and services for the application in the new cloud system;
   updating the descriptor record for the application to include details of the resources and services provisioned in the new cloud system; and executing an instance of the application in the new cloud system, the application using the stored application state, the user state, the restart point and the other data during execution, wherein the storing, provisioning, updating and executing is done in substantial real-time.

10. The method of claim 1, further includes, detecting changes to the one or more resources and services provisioned for the application; and updating, in substantial real-time, the descriptor record associated with the application in accordance to the detected changes, so as to enable provisioning of the required resources and services for subsequent execution of the application, wherein the changes to the one or more resources and services include additions, changes, deletions, upgrades or any combinations thereof, the updated descriptor record defining a current environment profile used for the execution of the application.

11. The method of claim 1, further includes, detecting changes to the one or more resources and services provisioned for the application;

evaluating the changes to the one or more resources and services to determine if the changes meet the attributes defined in the descriptor record for the application to enable optimal performance of the application; and migrating the application to a new cloud system, when the evaluation identifies the changes to the one or more resources and services provisioned for the application in the cloud system do not meet the corresponding attributes defined in the descriptor record for the application, the new cloud system including the required resources and services that at least match the corresponding attributes defined in the descriptor record for the application to enable optimal performance of the application.

12. The method of claim 11, wherein migrating the application further includes, storing an user state, an application state, a restart point, and other data related to the application;

provisioning the resources and services in the new cloud system;

updating the descriptor record for the application to include details of the resources and services provisioned in the new cloud system; and executing an instance of the application in the new cloud system, the application using the stored application state, the user state, the restart point and the other data during execution, wherein the storing, provisioning, updating and executing is done in substantial real-time.

13. A method, comprising:

receiving code of an application that is to be executed in a specific environment of a cloud system;

analyzing the code of the application to determine attributes of one or more resources and services required for successful execution of the application in the cloud system;

defining a descriptor record for the application, the descriptor record defining an environment profile for the specific environment of the cloud system, wherein the descriptor record is generated by mapping the resources and services required to one or more actions to be performed for provisioning the resources and services in the cloud system for successful execution of the application, wherein the generated descriptor record identifies a predefined sequence for the one or more actions to be taken based on the attributes;

storing the descriptor record in a descriptor file maintained in a deployment system database, detecting a request for the execution of the application, the detection resulting in a retrieval of the descriptor record for the application from the descriptor file, the retrieval causing automatic triggering of the predefined sequence for the one or more actions identified in the descriptor record resulting in the provisioning of the required services and resources on the cloud system to enable successful execution of the application, wherein method operations are performed by a processor.

14. The method of claim 13, wherein the descriptor record identifies minimal resources and services required for successful execution of the application in the specific environment of the cloud system.

15. The method of claim 13, wherein the actions to be performed further includes identifying and instantiating a workflow for each of the one or more actions identified in the descriptor record defined for the application.

16. The method of claim 15, wherein the workflow for provisioning the resources and services are deployed in one of a privately owned cloud system and a publicly available cloud system.

17. The method of claim 13, further includes, detecting changes in one or more of the resources and services that are provisioned for the application; and automatically updating the descriptor record of the application to reflect the changes.

18. The method of claim 13, further includes, detecting changes in one or more of the resources and services provisioned for the application; and automatically migrating the application from the cloud system to a new cloud system, the new cloud system includes the resources and services required for optimal execution of the application and is identified based on type of performance desired for the application.

19. The method of claim 13, further includes, migrating a specific one of the resources or services provisioned for the application to a different resource or service, the different resource or service identified based on pre-defined rules, wherein the different resource or service is identified in the cloud service or a new cloud service and wherein the migrating of the specific one of the resources or services further includes automatically updating the descriptor record for the application to reflect the different resource or service.

20. A non-transitory computer-readable storage medium having computer executable instructions stored thereon, which cause one or more processors of a computer system to carry out a method, the computer-readable storage medium comprising:

program instructions for receiving attributes of one or more resources and services required on a cloud system for executing an application;

program instructions for generating a descriptor record for the application using the received attributes, the descriptor record defining an environment profile that is specific for the cloud system, wherein the descriptor record is generated by translating the one or more resources and services required into one or more actions to be taken for provisioning the required resources and services in the cloud system for successful execution of the application, wherein the generated descriptor record identifies a predefined sequence for the one or more actions to be taken based on the received attributes; and program instructions for storing the descriptor record in a descriptor file maintained in a deployment system database;

program instructions for detecting a request for the execution of the application, the program instructions for detecting further includes program instructions for retrieving the descriptor record for the application from the descriptor file, the retrieval causing automatic triggering of the predefined sequence for the one or more actions identified in the descriptor record resulting in the provisioning of the required services and resources on the cloud system to enable successful execution of the application.

\* \* \* \* \*